US012658616B2

(12) United States Patent
Tsunemura et al.

(10) Patent No.: US 12,658,616 B2
(45) Date of Patent: Jun. 16, 2026

(54) CONNECTOR AND ELECTRONIC APPARATUS

(71) Applicant: KYOCERA CORPORATION, Kyoto (JP)

(72) Inventors: Akio Tsunemura, Machida (JP); Shaolong Wu, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 276 days.

(21) Appl. No.: 18/281,755

(22) PCT Filed: Mar. 10, 2022

(86) PCT No.: PCT/JP2022/010736
§ 371 (c)(1),
(2) Date: Sep. 12, 2023

(87) PCT Pub. No.: WO2022/196536
PCT Pub. Date: Sep. 22, 2022

(65) Prior Publication Data

US 2024/0162640 A1 May 16, 2024

(30) Foreign Application Priority Data

Mar. 17, 2021 (JP) ................................ 2021-044049

(51) Int. Cl.
*H01R 12/71* (2011.01)
*H01R 13/03* (2006.01)
(Continued)

(52) U.S. Cl.
CPC ........... *H01R 12/716* (2013.01); *H01R 13/03* (2013.01); *H01R 13/2407* (2013.01); *H01R 13/405* (2013.01); *H01R 13/502* (2013.01)

(58) Field of Classification Search
CPC .. H01R 12/716; H01R 13/03; H01R 13/2407; H01R 13/405; H01R 13/502;
(Continued)

(56) References Cited

U.S. PATENT DOCUMENTS 10,249,969 B2 4/2019 Ono
10,651,579 B2 5/2020 Ono
(Continued)

FOREIGN PATENT DOCUMENTS

JP 2018170296 A 11/2018
JP 2018190642 A 11/2018
(Continued)

*Primary Examiner* — Abdullah A Riyami
*Assistant Examiner* — Nelson R. Burgos-Guntin
(74) *Attorney, Agent, or Firm* — Duane Morris LLP

(57) ABSTRACT

According to the present disclosure, a connector (10) configured to engage a connection object (50) includes i) an insulator (20) including an engagement projection (22) and a peripheral wall (23) surrounding the engagement projection (22), ii) a first metal fitting (**40*a*) attached to the engagement projection (22), and iii) a second metal fitting (40*b*) attached to the peripheral wall (23). The first metal fitting (40*a*) and the second metal fitting (40*b*) are separate members. A strength of the first metal fitting (40*a*) and a strength of the second metal fitting (40*b***) are different from each other.

17 Claims, 11 Drawing Sheets

(51) Int. Cl.

| | |
|---|---|
| ***H01R 13/24*** | (2006.01) |
| ***H01R 13/405*** | (2006.01) |
| ***H01R 13/502*** | (2006.01) |

(58) Field of Classification Search
CPC .... H01R 12/57; H01R 12/7088; H01R 12/73; H01R 13/20; H01R 12/71
See application file for complete search history.

(56) References Cited

U.S. PATENT DOCUMENTS

| | | | | |
|---|---|---|---|---|
| 10,756,466 | B2 | 8/2020 | Ono | |
| 2013/0260594 | A1* | 10/2013 | Lee | H01R 12/88 439/345 |
| 2014/0287610 | A1* | 9/2014 | Komoto | H01R 12/716 439/350 |
| 2018/0331444 | A1* | 11/2018 | Ono | H01R 13/504 |
| 2019/0103700 | A1* | 4/2019 | Esmaeili | H01R 12/592 |
| 2019/0140394 | A1* | 5/2019 | Tanaka | H01R 12/727 |
| 2019/0229447 | A1* | 7/2019 | Tsukashima | H01R 13/629 |
| 2020/0212634 | A1* | 7/2020 | Teruki | H01R 12/73 |
| 2020/0244011 | A1* | 7/2020 | Kitazawa | H01R 13/6585 |
| 2020/0343660 | A1* | 10/2020 | Gondo | H01R 12/57 |
| 2020/0358213 | A1* | 11/2020 | Tanaka | H01R 12/73 |
| 2020/0381857 | A1* | 12/2020 | Meng | H01R 13/6594 |
| 2021/0044041 | A1* | 2/2021 | Hayashi | H01R 12/73 |
| 2021/0359466 | A1 | 11/2021 | Sugaya et al. | |
| 2023/0261400 | A1* | 8/2023 | Tsunemura | H01R 13/46 439/74 |

FOREIGN PATENT DOCUMENTS

| | | | |
|---|---|---|---|
| JP | 2021026981 | A | 2/2021 |
| KR | 101985141 | B1 | 5/2019 |
| WO | 2020059210 | A1 | 3/2020 |

* cited by examiner

1

1

CONNECTOR AND ELECTRONIC APPARATUS

CROSS-REFERENCE TO RELATED APPLICATIONS

This application claims the benefit of Japanese Patent Application No. 2021-044049 filed Mar. 17, 2021, which is hereby incorporated by reference herein in its entirety.

TECHNICAL FIELD

The present disclosure relates to a connector and an electronic apparatus.

BACKGROUND OF INVENTION

An art of a connector module including a connector and a connection object is known widely. The connector and the connection object are mounted on respective separate circuit substrates, and the connector module electrically connects the separate circuit substrates to each other. For example, Patent Literature 1 discloses an electric connector for circuit substrate. The electric connector for circuit substrate can prevent both a projecting wall and end walls from breaking during connection or disconnection of the connector.

Electronic apparatuses, such as mobile devices, have been subjected to weight and size reduction in recent years, and connectors mounted in the electronic apparatuses are expected to be reduced in size and height.

CITATION LIST

Patent Literature

Patent Literature 1: Japanese Unexamined Patent Application Publication No. 2018-170296

SUMMARY

According to an embodiment of the present disclosure, a connector configured to engage a connection object includes i) an insulator including an engagement projection and a peripheral wall surrounding the engagement projection, ii) a first metal fitting attached to the engagement projection, and iii) a second metal fitting attached to the peripheral wall. The first metal fitting and the second metal fitting are separate members. A strength of the first metal fitting and a strength of the second metal fitting are different from each other.

In an embodiment of the present disclosure, an electronic apparatus includes the above connector.

DESCRIPTION OF EMBODIMENTS

Figure 1:
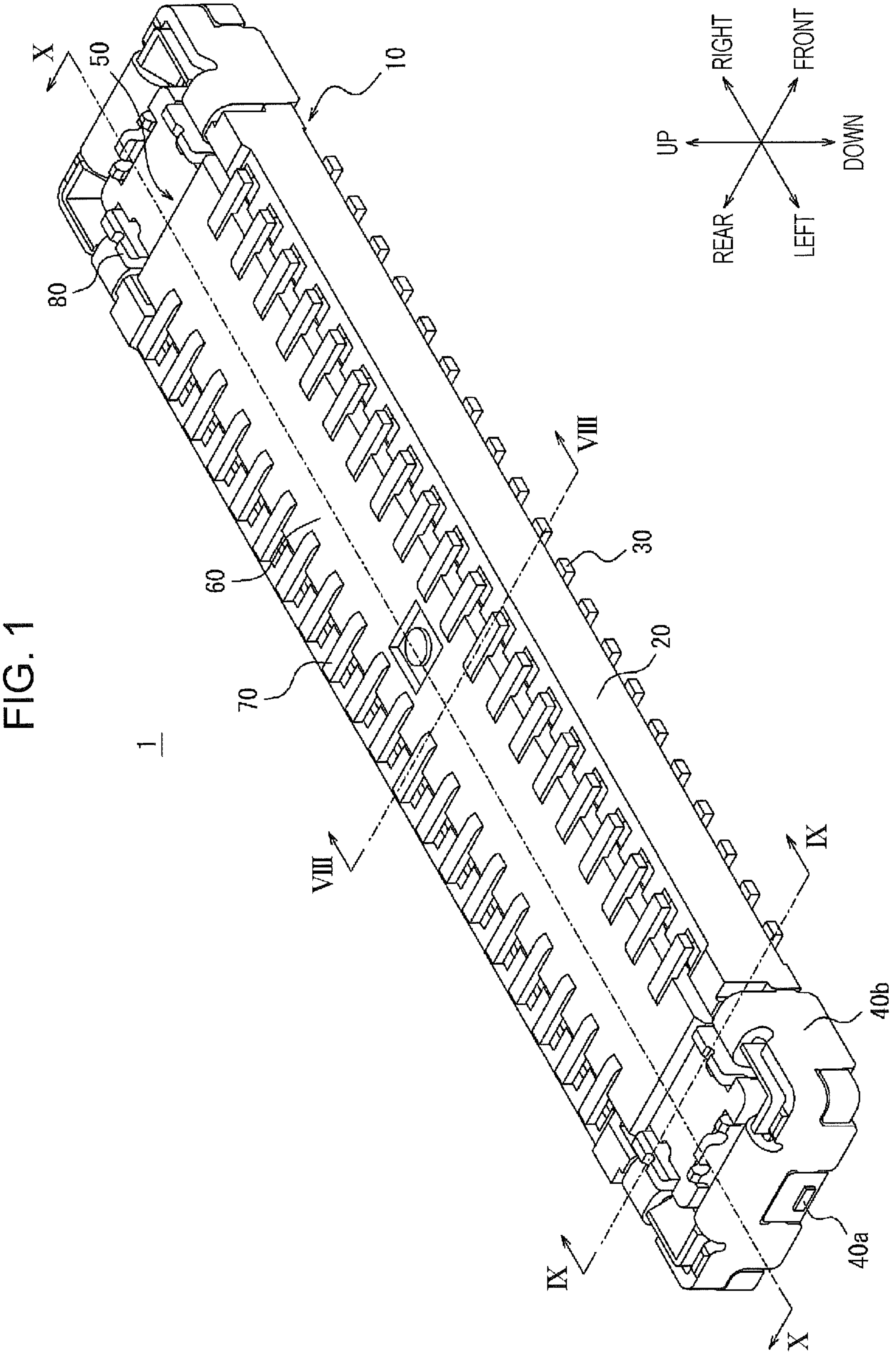
FIG. 1 is a perspective view, as viewed from above, illustrating the exterior of a connector module according to an embodiment, in which a connector and a connection object are connected to each other.

Connectors are subjected to size and height reduction. As a result, components of a connector, such as metal fittings or an insulator, tend to be broken easily when the connector hits a connection object during the engagement between the connector and the connection object. In the electric connector for circuit substrate disclosed in Patent Literature 1, for example, a metal fitting to be attached to a protruding wall and a metal fitting to be attached to an end wall are integrally formed as one piece. In this case, the metal fitting is made of the same material at both the protruding wall and the end wall. In other words, the strength of the metal fitting is the same at both the protruding wall and the end wall. This makes it difficult to adopt a flexible design where the strength of part of the metal fitting is increased, if necessary, relative to the other part of the metal fitting. Accordingly, it is difficult to further increase the strength of the metal fitting and the insulator in order to reduce the likelihood of the connector breaking.

According to an embodiment of the present disclosure, the connector and the electronic apparatus improve the robustness during and after the engagement between the connector and the connection object even in the case of the connector being reduced in size and height.

The following describes an embodiment of the present disclosure in detail with reference to the drawings. In the following description, the front-rear direction, the right-left direction, and the up-down direction are defined with reference to the directions of arrows in the drawings. The directions of arrows in FIGS. 1 to 6 and in FIGS. 8 to 11 are aligned each other with corresponding arrows in different figures. In some drawings, illustration of circuit substrates CB1 and CB2 (to be described later) is omitted to facilitate easy understanding.

Figure 2:
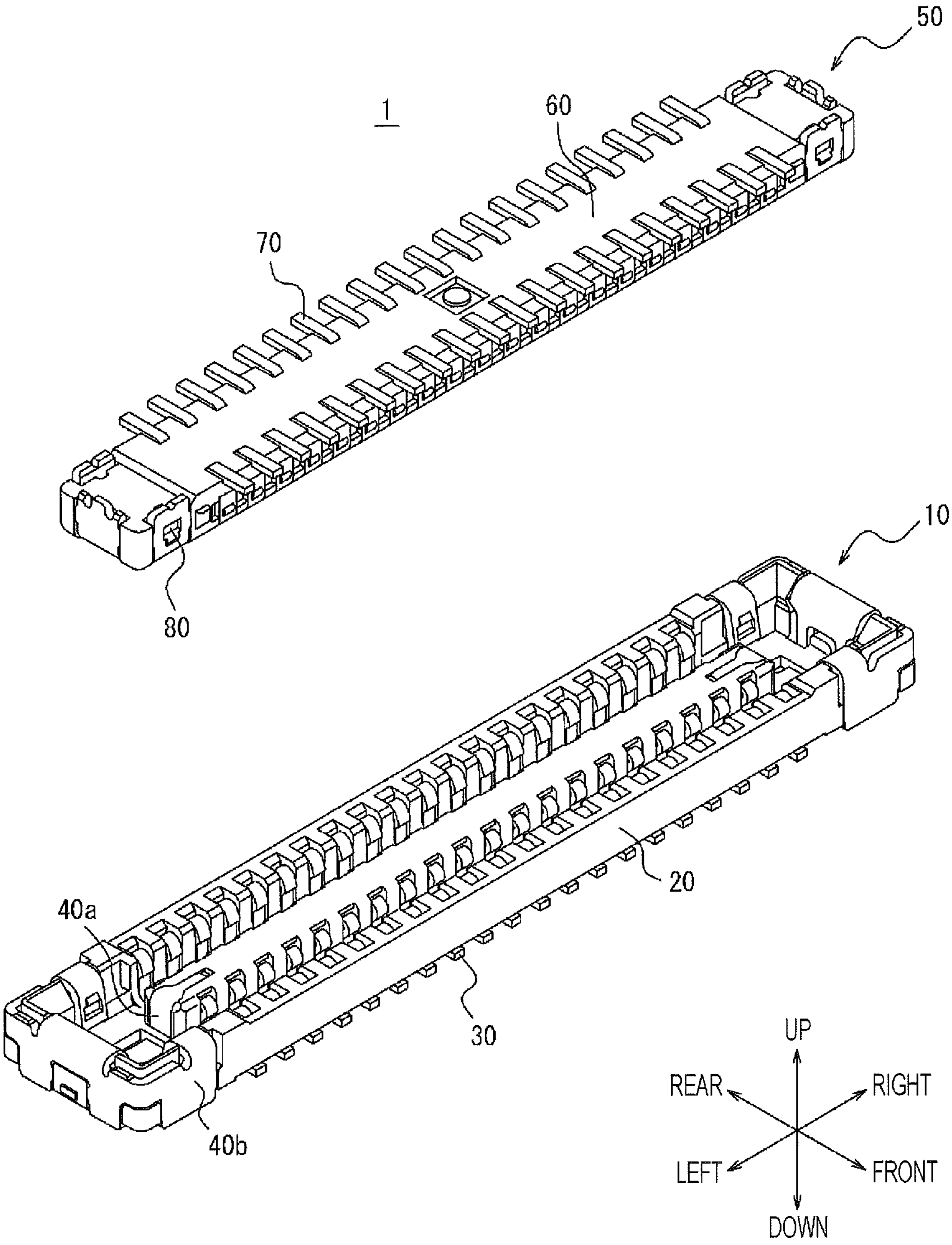
FIG. 2 is a perspective view, as viewed from above, illustrating the exterior of the connector module according to the embodiment, in which the connector and the connection object are separated from each other.

FIG. 1 is a perspective view, as viewed from above, illustrating the exterior of a connector module 1 according to an embodiment, in which a connector 10 and a connection object 50 are connected to each other. FIG. 2 is a perspective view, as viewed from above, illustrating the exterior of the connector module 1 according to the embodiment, in which the connector 10 and the connection object 50 are separated from each other.

For example, as illustrated in FIG. 2, the connector module 1 includes the connector 10 and the connection object 50 that can be connected to each other. The connector 10 includes a first insulator 20 and first contacts 30 attached to the first insulator 20. The connector 10 also includes first metal fittings 40*a* and second metal fittings 40*b*, and these fittings are attached to the first insulator 20.

The connection object 50 is connectable to the connector 10. The connection object 50 includes a second insulator 60. The second insulator 60 engages the first insulator 20 when the connector 10 and the connection object 50 are connected to each other. The connection object 50 also includes second contacts 70 attached to the second insulator 60. The second contacts 70 are in contact with respective first contacts 30 in an engagement state in which the first insulator 20 engages the second insulator 60. The connection object 50 further includes metal fittings 80 attached to the second insulator 60. The metal fittings 80 are in contact with respective second metal fittings **40*b* in the engagement state. This causes the second metal fittings 40*b*** to deform elastically.

In the following description, the connector 10 of the embodiment is assumed to be a receptacle connector by way of example. The connection object 50 is assumed to be a plug connector. More specifically, in the engagement state in which the first insulator 20 and the second insulator 60 engage each other, the connector 10 in which the first contacts 30 are deformed elastically is assumed to be the receptacle connector, and the connection object 50 in which the second contacts 70 are not deformed elastically is assumed to be the plug connector. The types of the connector 10 and the connection object 50 are not limited to those described above. For example, the connector 10 may serve as the plug connector, and the connection object 50 may serve as the receptacle connector.

The connection object 50 is not limited to the above but can be a connection object other than the plug connector or the receptacle connector. For example, the connection object 50 can be a flexible printed circuit board (FPC), a flexible flat cable, a rigid board, or a card edge connector of an arbitrary circuit substrate.

In the following description, the connector 10 and the connection object 50 are assumedly mounted on circuit substrates CB1 and CB2, respectively. The circuit substrate CB1 and the circuit substrate CB2 are electrically coupled to each other in the connection state in which the connector 10 and the connection object 50 are connected to each other. The circuit substrates CB1 and CB2 may be rigid substrates or may be any arbitrary circuit substrates other than the rigid substrates. For example, at least one of the circuit substrates CB1 and CB2 may be an FPC.

In the following description, the connector 10 and the connection object 50 are assumedly connected to respective circuit substrates CB1 and CB2 in the vertical direction. The connector 10 and the connection object 50 are connected to each other, for example, in the up-down direction. The direction of connection is not limited to the up-down direction. The connector 10 and the connection object 50 may be connected to respective circuit substrates CB1 and CB2 in the horizontal direction. The connector 10 and the connection object 50 may be connected to each other in such a manner that one of the connector 10 and the connection object 50 is positioned vertically relative to the circuit substrate to which the one is mounted and the other one of the connector 10 and the connection object 50 is positioned horizontally relative to the circuit substrate to which the other one is mounted.

For example, the term "longitudinal direction of the connector 10", as used in the claims, corresponds to the right-left direction. For example, the term "transverse direction of the connector 10" corresponds to the front-rear direction.

Figure 3:
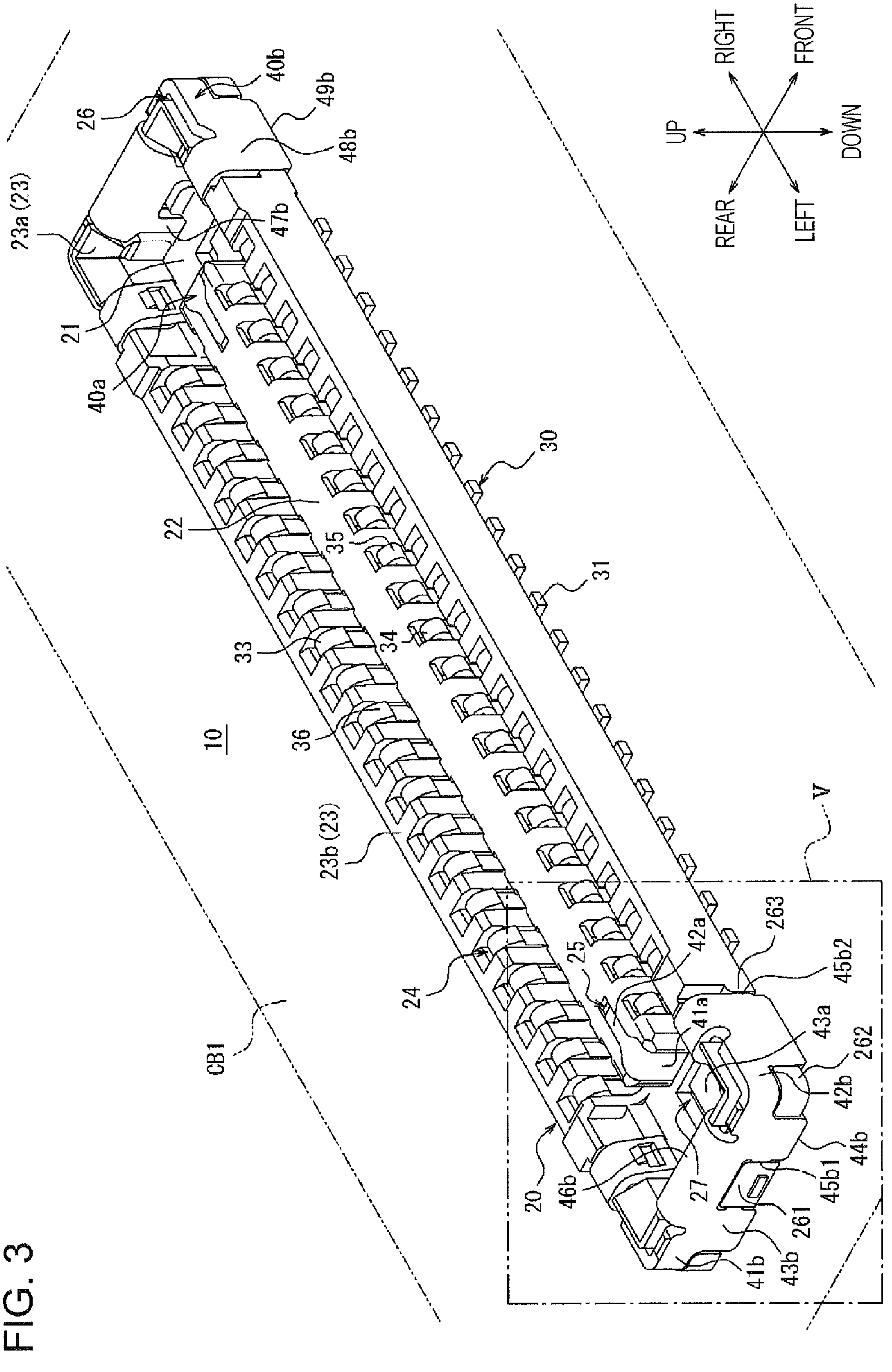
FIG. 3 is a perspective view, as viewed from above, illustrating the exterior of the connector of FIG. 1.

FIG. 3 is a perspective view, as viewed from above, illustrating the exterior of the connector 10 of FIG. 1. For example, the connector 10 can be obtained in the following manner: the first insulator 20 is formed integrally with the first metal fittings **40*a* using insert molding, and the first contacts 30 and the second metal fittings 40*b* are press-fitted into the first insulator 20**.

Figure 4:
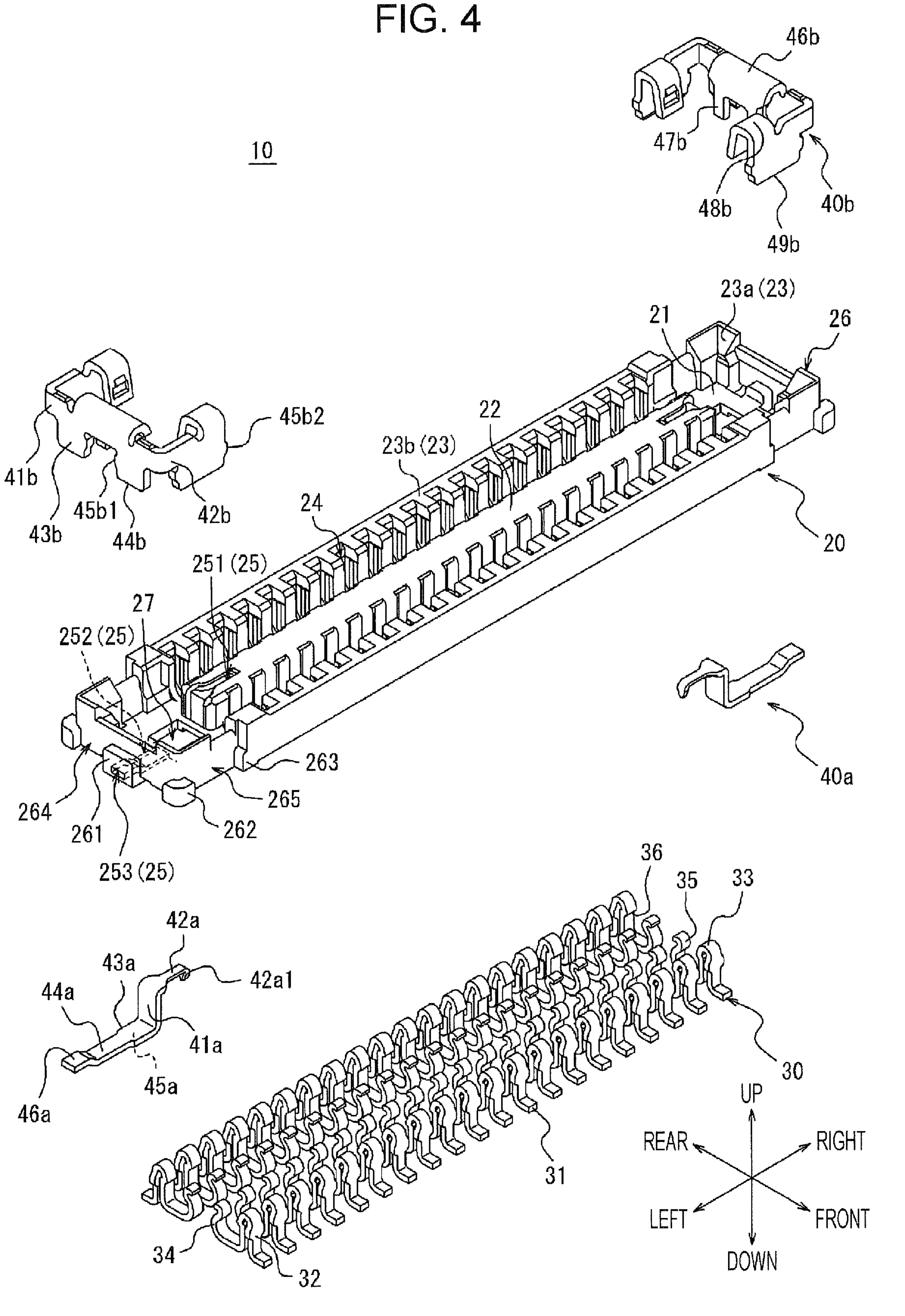
FIG. 4 is an exploded perspective view, as viewed from above, illustrating the connector of FIG. 3.

FIG. 4 is an exploded perspective view, as viewed from above, illustrating the connector 10 of FIG. 3. Although the first insulator 20 and the first metal fittings **40*a* are formed integrally by insert molding, the first metal fittings 40*a* and the first insulator 20 are illustrated separately in FIG. 4** to facilitate easy understanding.

The first insulator 20 of the connector 10 is made of a synthetic resin having insulating and heat-resisting properties. The first insulator 20 is shaped like a plate elongated in the right-left direction. The first insulator 20 includes a bottom plate 21 that constitutes the bottom part of the first insulator 20. The first insulator 20 includes an engagement projection 22 that projects upward from the bottom plate 21 in a central part of the bottom plate 21 in the front-rear direction and in the right-left direction. The first insulator 20 includes peripheral walls 23 that surround the engagement projection 22. The peripheral walls 23 surround the engagement projection 22 in four directions, in other words, in the front-rear direction and in the right-left direction. The peripheral walls 23 include transverse walls **23*a* and longitudinal walls 23*b*. The transverse walls 23*a* extend in the front-rear direction. The longitudinal walls 23*b*** extend in the right-left direction.

The first insulator 20 includes first-contact mounting grooves 24. Each first-contact mounting groove 24 is formed continuously in the front-rear direction along an inside surface of a longitudinal wall **23*b*, the bottom plate 21, and an inside surface of the engagement projection 22. A first contact 30 is mounted in each first-contact mounting groove 24. Multiple first-contact mounting grooves 24 are formed, and the number of the first-contact mounting grooves 24 corresponds to the number of the first contacts 30. The first-contact mounting grooves 24 are arranged in the arrangement direction of the first contacts 30**.

Figure 5:
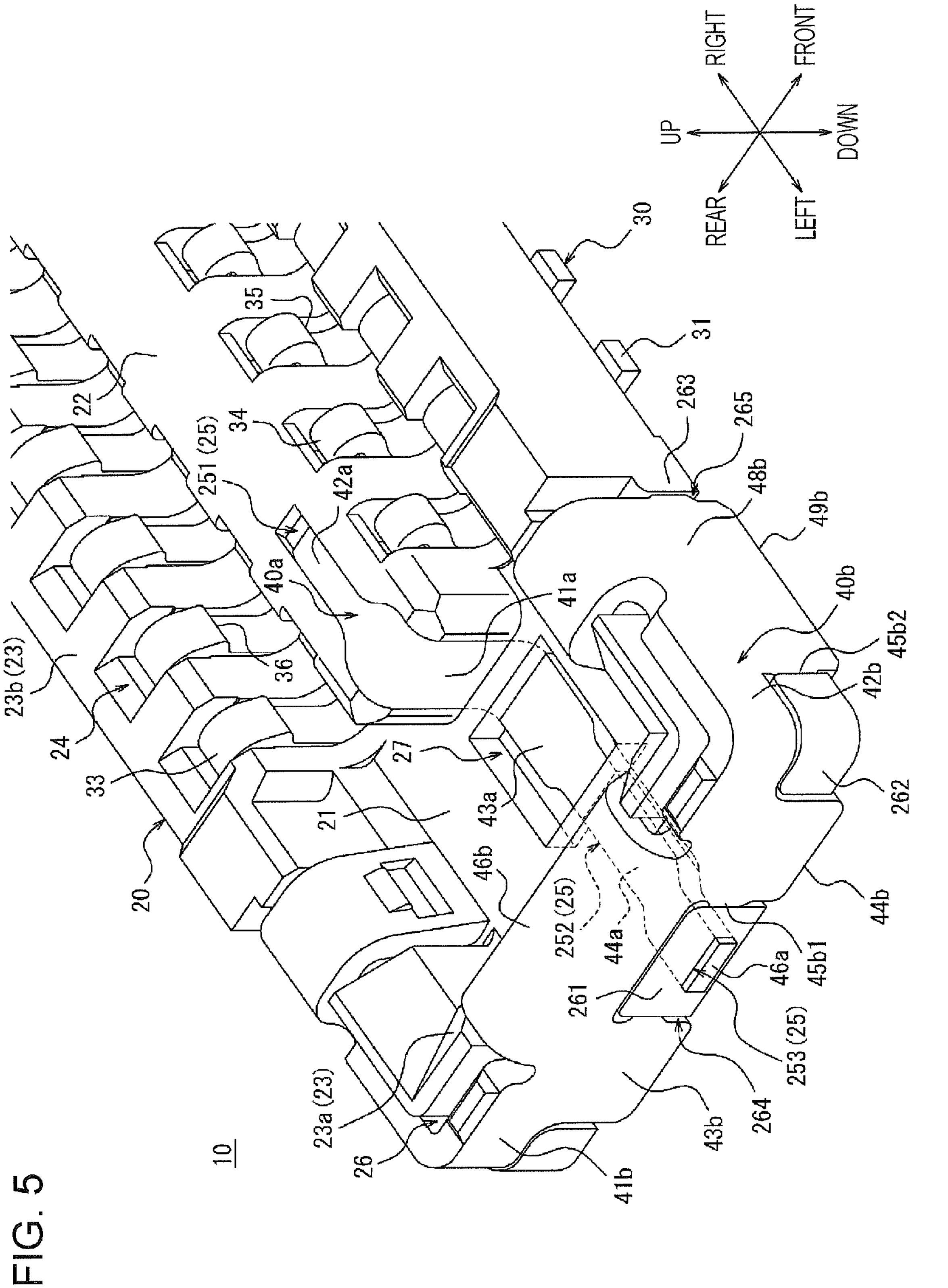
FIG. 5 is an enlarged view illustrating a region surrounded by the dash-dot-dot line in FIG. 3.

The first insulator 20 includes first-metal-fitting holding portions 25. Each first-metal-fitting holding portion 25 extends from one end of the engagement projection 22 in the right-left direction to a corresponding transverse wall **23*a* along part of the bottom plate 21. As illustrated in FIG. 5, which will be described later, the first-metal-fitting holding portion 25 includes a first cavity 251 recessed at each end portion of the engagement projection 22, the end portion being positioned in the right-left direction. The first-metal-fitting holding portion 25 includes a second cavity 252 recessed at the bottom surface of the bottom plate 21. The first-metal-fitting holding portion 25 includes a third cavity 253 formed so as to pierce through the transverse wall 23*a*. A first metal fitting 40*a* is attached to the first-metal-fitting holding portion 25. The first-metal-fitting holding portion 25 extends in the right-left direction so as to connect the engagement projection 22 to the transverse wall 23*a***.

The first insulator 20 includes second-metal-fitting mounting portions 26. Each second-metal-fitting mounting portion 26 is formed continuously along the transverse wall **23*a* and also along corresponding end portions of the longitudinal walls 23*b*, the end portions being positioned in the right-left direction. A second metal fitting 40*b* is attached to the second-metal-fitting mounting portion 26**.

Each second-metal-fitting mounting portion 26 includes a first wall portion 261. The first wall portion 261 is formed at a lower position in a central portion of each transverse wall **23*a* in the front-rear direction, and the first wall portion 261** protrudes outward in the right-left direction. The third cavity 253 of the first-metal-fitting holding portion 25 pierces through the first wall portion 261. The second-metal-fitting mounting portion 26 includes second wall portions 262. The second wall portions 262 are formed at respective corner portions of the first insulator 20. More specifically, each second wall portion 262 is formed at a lower position in each corner portion of the first insulator 20 so as to have a shape like the letter L along the transverse wall 23*a* and the longitudinal wall 23*b*. The second-metal-fitting mounting portion 26 includes third wall portions 263. The third wall portions 263 are formed at respective longitudinal walls 23*b* so as to be spaced from corresponding second wall portions 262 in the right-left direction. The first wall portions 261, the second wall portions 262, and the third wall portions 263 form a rectangular outermost shape of the first insulator 20 in the front-rear direction and in the right-left direction.

Each second-metal-fitting mounting portion 26 also includes first mounting grooves 264 that are formed between the first wall portion 261 and respective second wall portions 262. Each second-metal-fitting mounting portion 26 also includes second mounting grooves 265 that are formed between respective second wall portions 262 and the corresponding third wall portions 263.

The first insulator 20 includes holes 27. Each hole 27 is formed so as to pierce through the bottom plate 21 in the up-down direction at a position interposed between the engagement projection 22 and the corresponding transverse wall 23*a* in the right-left direction.

Each first contact 30 is made, for example, of a thin plate that has a spring-like elasticity and is made of a copper alloy, such as phosphor bronze, beryllium copper, or copper-titanium alloy, or of a Corson system copper alloy. The first contact 30 is formed of the thin plate so as to have a shape illustrated in FIG. 4 using progressive metal forming (stamping). The surface of the first contact 30 is plated with nickel to form a foundation layer and further plated with gold or tin thereover.

The first contact 30 includes a mount portion 31 that is an L-shaped protrusion protruding outward in the front-rear direction. The first contact 30 also includes a locking portion 32 that extends upward from the top end of the mount portion 31. The locking portion 32 is formed so as to be wider in the right-left direction than the mount portion 31. The first contact 30 includes a curved portion 33 shaped like the letter U. The curved portion 33 protrudes upward from the locking portion 32.

The first contact 30 includes an elastic contact arm 34 that continues to the curved portion 33 and is shaped like the letter S. The first contact 30 includes an elastic contact point 35. The electric contact point 35 is formed at the bent end portion of the elastic contact atm 34. The electric contact point 35 faces outward in the front-rear direction. The first contact 30 also includes a contact point 36 formed at the curved portion 33. The contact point 36 protrudes so as to oppose the elastic contact point 35 in the front-rear direction.

Each first metal fitting 40*a* is fixated of a thin plate of an arbitrary metal so as to have a shape illustrated in FIG. 4 using progressive metal forming (stamping). The first metal fitting 40*a* as a whole has a crank-like shape. More specifically, the first metal fitting 40*a* includes a hook portion 42*a*, a first base portion 41*a*, and a second base portion 43*a* (to be described later), and these portions integrally form the crank-like shape as a whole. Similarly, the first base portion 41*a* and the second base portion 43*a* integrally form the crank-like shape as a whole. The method of manufacturing the first metal fitting 40*a* includes a step of punching out a piece and a step of bending the punched piece in the thickness direction. The method of manufacturing the first metal fitting 40*a* is not limited to this but may include the step of punching only.

The first metal fitting 40*a* includes the first base portion 41*a*. The first base portion 41*a* is shaped like the letter L. For example, the first base portion 41*a* extends in the up-down direction, and the first base portion 41*a* is bent at the top end thereof toward one side in the right-left direction. The first base portion 41*a* connects the second base portion 43*a* and the hook portion 42*a* (to be described later) together.

The first metal fitting 40*a* includes the hook portion 42*a*. The first base portion 41*a* has the portion that extends toward the above-described one side in the right-left direction, and the hook portion 42*a* extends further toward the one side from the portion of the first base portion 41*a*. The hook portion 42*a* is shaped like the letter L. The hook portion 42*a* has a tip end 42*a*1, and the tip end 42*a*1 is, for example, bent downward from the end of the hook portion 42*a*. The width of the hook portion 42*a* in the front-rear direction is smaller than the width of any other portion of the first metal fitting 40*a*. In other words, the width of the hook portion 42*a* in the front-rear direction is smaller, for example, than the width of the first base portion 41*a* that continues to the hook portion 42*a*. The width of the hook portion 42*a* in the front-rear direction is smaller, for example, than the width of the second base portion 43*a* or the width of a narrow portion 44*a* (to be described later).

The first metal fitting 40*a* includes the second base portion 43*a* that extends straight toward the other side in the right-left direction from the bottom end of the first base portion 41*a*. In the front-rear direction, the width of the second base portion 43*a* at a position near the first base portion 41*a* is the same as or similar to the width of the first base portion 41*a* that continues to the second base portion 43*a*. For example, the second base portion 43*a* continues to the first base portion 41*a* so as to maintain the same width in the transverse direction of the connector 10.

Figure 6:
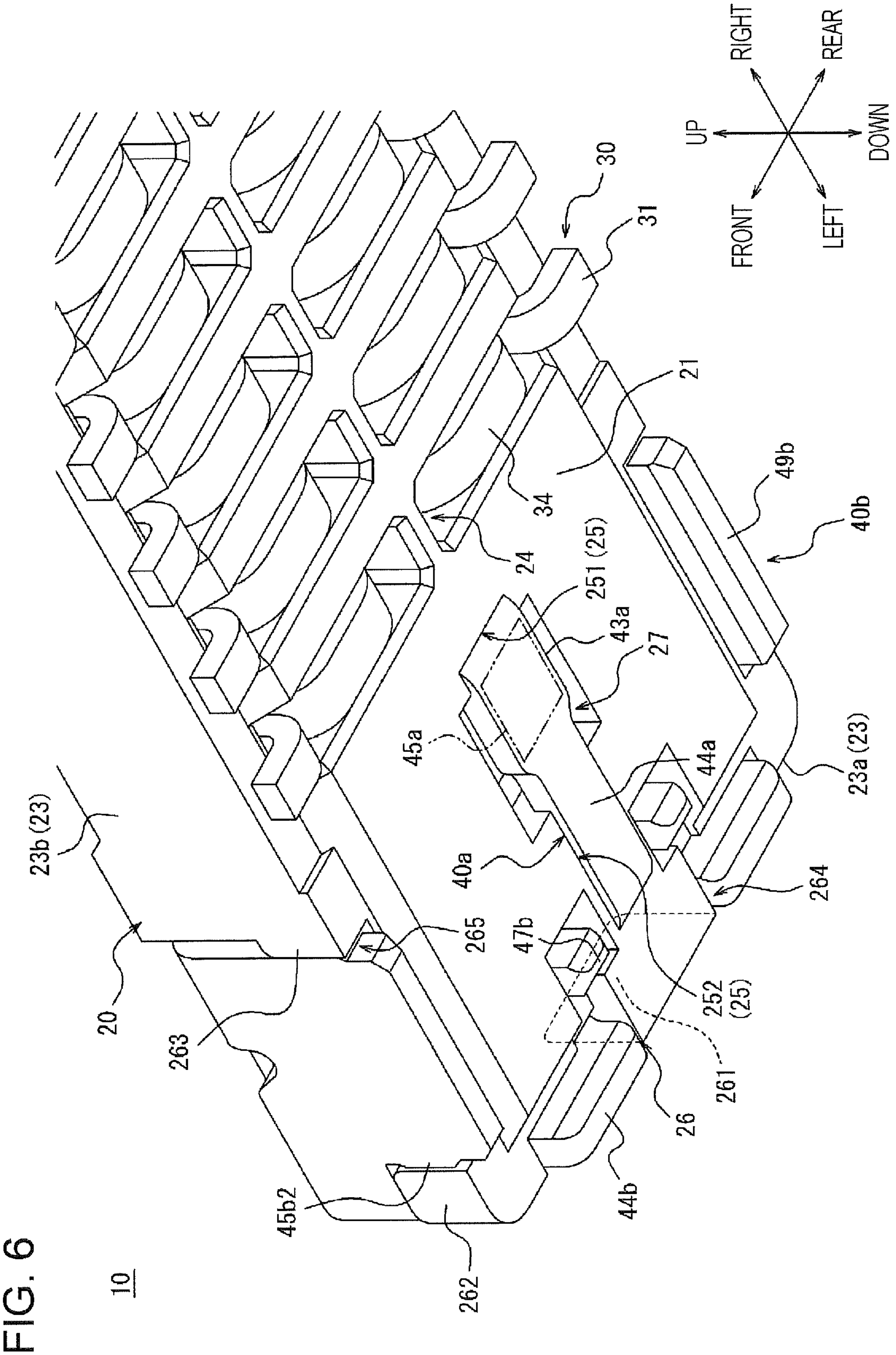
FIG. 6 is an enlarged view illustrating the connector of FIG. 5 as viewed from below.

The first metal fitting 40*a* includes a narrow portion 44*a* in the second base portion 43*a*. The narrow portion 44*a* is shaped so as to be narrower than any other portion of the second base portion 43*a* in the front-rear direction. The narrow portion 44*a*, of which the width in the front-rear direction is reduced symmetrically, continues to a portion of the second base portion 43*a* near the first base portion 41*a*. As illustrated in FIG. 6 (to be described later), the first metal fitting 40*a* includes a mount portion 45*a*. For example, the mount portion 45*a* includes a predefined region on the bottom surface of the portion of the second base portion 43*a*, the portion being positioned near the first base portion 41*a*. The mount portion 45*a* is formed in the second base portion 43*a* at a position adjacent to the narrow portion 44*a* in the right-left direction. The mount portion 45*a*, however, is not limited to the region surrounded by the dash-dot-dot line on the bottom surface of the second base portion 43*a*. In addition to this region, the mount portion 45*a* may further include the bottom surface of the narrow portion 44*a* and side surfaces of the second base portion 43*a*, the side surfaces extending in the up-down direction in the hole 27 of the first insulator 20.

Each first metal fitting 40*a* also includes an end portion 46*a*. The end portion 46*a* is formed in the narrow portion 44*a* of the second base portion 43*a* at an end opposite to the first base portion 41*a*. The end portion 46*a* is raised like a step from the other part of the second base portion 43*a*.

Each second metal fitting 40*b* is formed of a thin plate of an arbitrary metal so as to have a shape illustrated in FIG. 4 using progressive metal forming (stamping). The method of manufacturing the second metal fitting 40*b* includes a step of punching out a piece and a step of bending the punched piece in the thickness direction.

The second metal fitting 40*b* includes a first base portion 41*b* that extends in the front-rear direction. The second metal fitting 40*b* also includes second base portions 42*b* that protrude toward one side in the right-left direction from respective ends of the first base portion 41*b* in the front-rear direction. The second metal fitting 40*b* includes protruding portions 43*b* that protrude straight downward from respective front and rear portions of the first base portion 41*b*. A pair of the protruding portions 43*b*, which are spaced in the front-rear direction, have respective edges that oppose each other. These edges of the protruding portions 43*b* and a lower edge of the first base portion 41*b* form a recess. The second metal fitting 40*b* includes first mount portions 44*b* positioned at respective bottom ends of the protruding portions 43*b*. The second metal fitting 40*b* includes locking portions 45*b*1 formed at respective protruding portions 43*b*. The locking portions 45*b*1 are formed so as to be wider in the front-rear direction than any other portions of the protruding portions 43*b*. The locking portions 45*b*1 protrude inward into the recess so as to reduce the width of the recess in the front-rear direction.

The second metal fitting 40*b* includes a curved portion 46*b* that is shaped like the letter U. The curved portion 46*b* is formed so as to protrude toward one side in the right-left direction from a central portion of the first base portion 41*b* in the front-rear direction. The second metal fitting 40*b* includes second mount portions 47*b* that protrude straight downward from respective bottom ends of front and rear portions of the curved portion 46*b*.

The second metal fitting 40*b* includes contact arms 48*b* each shaped like the letter U. The contact arms 48*b* are formed near one ends of respective second base portions 42*b* in the right-left direction. Each contact arm 48*b* has a portion extending inward in the front-rear direction, and the portion has a spring-like elasticity. The second metal fitting 40*b* includes third mount portions 49*b* positioned at bottom ends of outside portions of respective second base portions 42*b*, the outside portions facing outward in the front-rear direction. The third mount portions 49*b* extend substantially entirely along respective second base portions 42*b* in the right-left direction. The second metal fitting 40*b* includes locking portions 45*b*2 that adjoin respective upper parts of the third mount portions 49*b*. Each locking portion 45*b*2 is formed in the second base portion 42*b* so as to have a width greater than that of any other part in the right-left direction. The locking portion 45*b*2 has symmetrically shaped protrusions that protrude from respective second base portions 42*b* in the right-left direction.

FIG. 5 is an enlarged view illustrating region V surrounded by the dash-dot-dot line in FIG. 3. FIG. 6 is an enlarged view illustrating the connector 10 of FIG. 5 as viewed from below.

Each first contact 30 is press-fitted into the first insulator 20 from below. In this state, the locking portion 32 of the first contact 30 is locked between inside surfaces of each first-contact mounting groove 24, the inside surfaces facing each other in the right-left direction. The first contact 30 is thereby held in the first-contact mounting groove 24.

When the first contact 30 is held in the corresponding first-contact mounting groove 24 of the first insulator 20, the elastic contact point 35 and the contact point 36 project from the first-contact mounting groove 24 into the space between the engagement projection 22 and the corresponding longitudinal wall 23*b*. The elastic contact arm 34 of the first contact 30 is elastically deformable in the front-rear direction inside the first-contact mounting groove 24. The tip end of each mount portion 31 is positioned outside the longitudinal wall 23*b* in the front-rear direction.

As illustrated in FIGS. 5 and 6, the first metal fitting 40*a* and the second metal fitting 40*b* are separate members. The first metal fittings 40*a* are separated from the second metal fittings 40*b*. In the separated state, each first metal fitting 40*a* opposes the corresponding second metal fitting 40*b* in the right-left direction. The first metal fitting 40*a* and the second metal fitting 40*b* have different strengths. In other words, the strength of one of the first metal fitting 40*a* and the second metal fitting 40*b* is greater than the strength of the other. For example, the strength of the first metal fitting 40*a* can be greater than that of the second metal fitting 40*b*. For example, the strength of the material of the first metal fitting 40*a* can be greater than that of the material of the second metal fitting 40*b*. For example, the term "strength" as used herein includes tensile strength.

The first metal fitting 40*a* and the second metal fitting 40*b* may be made of different materials. For example, the material of the first metal fitting 40*a* can be stainless steel, and the material of the second metal fitting 40*b* can be phosphor bronze. The materials are not limited to the above. The material of the first metal fitting 40*a* and the material of the second metal fitting 40*b* may be selected arbitrarily from a group of material candidates so as to satisfy the condition that the strength of the first metal fitting 40*a* is greater than the strength of the second metal fitting 40*b*. The term "a group of material candidates" include, for example, stainless steel, phosphor bronze, iron, Corson copper, copper titanium, beryllium copper, and aluminum.

The first metal fitting 40*a* can be made of the same type of material as that of the second metal fitting 40*b* insofar as the strength of the first metal fitting 40*a* is greater than the strength of the second metal fitting 40*b*. Even if the first metal fitting 40*a* and the second metal fitting 40*b* are made of the same type of alloy, such as phosphor bronze, the strength of the first metal fitting 40*a* can be greater than that of the second metal fitting 40*b* if, for example, the number, type, or quality of the alloy is different. For example, even if the first metal fitting 40*a* and the second metal fitting 40*b* are made of the same type of material, such as phosphor bronze, the thickness of the first metal fitting 40*a* can be made greater than that of the second metal fitting 40*b*, which increases the strength of the first metal fitting 40*a* relative to that of the second metal fitting 40*b*.

For example, the strength of the first contact 30 can be substantially the same as that of the second metal fitting 40*b*. The strength of the first metal fitting 40*a* can be greater than those of the second metal fitting 40*b* and the first contact 30. The materials of the first metal fitting 40*a*, the second metal fitting 40*b*, and the first contact 30 may be selected arbitrarily from the group of material candidates so as to satisfy the above strength relations among the first metal fitting 40*a*, the second metal fitting 40*b*, and the first contact 30.

A pair of the first metal fittings 40*a* are attached to respective ends of the engagement projection 22, the ends being positioned oppositely in the longitudinal direction of the connector 10. Each first metal fitting 40*a* extends in the longitudinal direction of the connector 10 from the engagement projection 22 to the corresponding transverse wall 23*a* to which a second metal fitting 40*b* is attached.

For example, each first metal fitting 40*a* is formed integrally in the corresponding first-metal-fitting holding portion 25 of the first insulator 20 using insert molding. Here, the first base portion 41*a* is folioed integrally in an end portion of the engagement projection 22, the end portion being positioned in the right-left direction, so as to extend along the top surface and the side surface of the end portion. For example, the first base portion 41*a* is formed integrally in the first cavity 251 of the first-metal-fitting holding portion 25. The top surface of the first base portion 41*a* and the side surface of the first base portion 41*a* facing outward in the right-left direction are exposed from the first insulator 20. For example, the top surface of the first base portion 41*a* is flush with the top surface of the engagement projection 22. For example, the side surface of the first base portion 41*a* facing outward in the right-left direction is flush with the corresponding side surface of the engagement projection 22. The top and side surfaces of the first base portion 41*a*, however, are not limited to the above. The top surface of the first base portion 41*a* may be disposed below the top surface of the engagement projection 22. The side surface of the first base portion 41*a* may be positioned further inside from the side surface of the engagement projection 22 in the right-left direction.

The hook portion 42*a* is formed integrally in the engagement projection 22 at the top surface thereof in such a manner that the tip end 42*a*1 of the hook portion 42*a* is embedded in the engagement projection 22. The top surface of the hook portion 42*a* is exposed from the first insulator 20. For example, the top surface of the hook portion 42*a* is flush with the top surface of the engagement projection 22. The top surface of the hook portion 42*a* is not limited to this but may be positioned below the top surface of the engagement projection 22.

The second base portion 43*a* is formed integrally in the bottom plate 21 and in the transverse wall 23*a*. For example, a part of the second base portion 43*a* excluding the end portion 46*a* is formed integrally in the second cavity 252 of the first-metal-fitting holding portion 25. In this state, a part of the second base portion 43*a* positioned in the hole 27 of the first insulator 20 is exposed upward from the hole 27. For example, the part of the second base portion 43*a* is positioned below the top surface of the bottom plate 21. For example, the end portion 46*a* of the second base portion 43*a* is formed integrally in the third cavity 253 of the first-metal-fitting holding portion 25. In this state, the end portion 46*a* is exposed outward in the right-left direction from the first wall portion 261 of the transverse wall 23*a*.

When the first metal fitting 40*a* and the first insulator 20 are formed integrally using insert molding, the narrow portion 44*a* is in close contact with the bottom plate 21. The second base portion 43*a* extends in the longitudinal direction of the connector 10. The second base portion 43*a* extends from the engagement projection 22 to the transverse wall 23*a* to which the second metal fitting 40*b* is attached. A part of the bottom surface of the second base portion 43*a*, the part excluding the bottom surface of the end portion 46*a*, is exposed from the first insulator 20. For example, the part of the bottom surface of the second base portion 43*a* is positioned below the bottom surface of the bottom plate 21.

The mount portion 45*a* of the first metal fitting 40*a* to be attached to the circuit substrate CB1 includes the bottom surface of the second base portion 43*a* that faces the circuit substrate CB1. For example, the mount portion 45*a* has an area extending in the front-rear and right-left directions on a part of the bottom surface of the second base portion 43*a*, the part being interposed between the first base portion 41*a* and the narrow portion 44*a* in the right-left direction. The mount portion 45*a* is positioned between the engagement projection 22 and the transverse wall 23*a* in the right-left direction. The mount portion 45*a* is formed at a position outside of, and adjacent to, the engagement projection 22 in the right-left direction.

The mount portion 45*a* is not limited to what has been described above. The mount portion 45*a* can include the entire bottom surface of the second base portion 43*a* except for the bottom surface of the end portion 46*a*. The mount portion 45*a* may further include part of side surfaces of the second base portion 43*a*, the part being positioned in the hole 27 and extending in the up-down direction. The mount portion 45*a* may also include a part of the top surface of the second base portion 43*a*, the part being exposed upward from the hole 27.

For example, each second metal fitting 40*b* is press-fitted into the first insulator 20 from above. Each second metal fitting 40*b* is attached to a corresponding one of the peripheral walls 23 in such a manner that the first wall portion 261 is nipped in the recess of the second metal fitting 40*b*, the recess being defined by the lower edge of the first base portion 41*b* and also by the mutually opposing edges of respective protruding portions 43*b* that are spaced in the front-rear direction.

Here, each locking portion 45*b*1 of the second metal fitting 40*b* is locked between the first wall portion 261 and the corresponding second wall portion 262 of the second-metal-fitting mounting portion 26 at a position outside the transverse wall 23*a* in the right-left direction. A pair of the protruding portions 43*b* separated in the front-rear direction are fitted in respective first mounting grooves 264. Similarly, each locking portion 45*b*2 of the second metal fitting 40*b* is locked between the second wall portion 262 and the corresponding third wall portion 263 of the second-metal-fitting mounting portion 26 at a position outside the corresponding longitudinal wall 23*b* in the front-rear direction. The locking portion 45*b*2 is thereby fitted in a corresponding one of second mounting grooves 265. Thus, the second metal fitting 40*b* is held by the second-metal-fitting mounting portion 26.

When the second metal fitting 40*b* is held by the second-metal-fitting mounting portion 26 of the first insulator 20, the second metal fitting 40*b* covers the entire transverse wall 23*a* and also covers part of the longitudinal walls 23*b* at ends in the right-left direction. In this state, the second metal fitting 40*b* surrounds both sides of the second base portion 43*a* of the first metal fitting 40*a* in the front-rear direction and the rear side of the second base portion 43*a* in the right-left direction. More specifically, the second base portions 42*b* of the second metal fitting 40*b* are disposed at both sides of the second base portion 43*a* of the first metal fitting 40*a* in the front-rear direction. The first base portion 41*b*, the protruding portions 43*b*, and the curved portion 46*b* of the second metal fitting 40*b* are disposed so as to superpose the outermost part of the second base portion 43*a* of the first metal fitting 40*a* in the right-left direction. Each contact arm 48*b* of the second metal fitting 40*b* includes a portion being positioned inside in the front-rear direction and extending downward, and this portion is elastically deformable in the front-rear direction.

The first mount portions 44*b* of the second metal fitting 40*b* are disposed along the outside surface of the corresponding transverse wall 23*a*, the outside surface facing outward in the right-left direction. The first mount portions 44*b* protrude downward below the bottom end of the transverse wall 23*a*. The first mount portions 44*b* are positioned respectively at both sides of the second base portion 43*a* of the first metal fitting 40*a* in the transverse direction of the connector 10. A pair of the first mount portions 44*b* are positioned so as to straddle the second base portion 43*a* of the first metal fitting 40*a* in the front-rear direction. For example, the first mount portions 44*b* are disposed respectively at symmetrical positions in the front-rear direction with respect to the second base portion 43*a* of the first metal fitting 40*a*.

The second mount portions 47*b* of the second metal fitting 40*b* are disposed along the inside surface of each transverse wall 23*a*, the inside surface facing inward in the right-left direction. The second mount portions 47*b* and the first mount portions 44*b* are disposed so as to straddle the transverse wall 23*a*. The second mount portions 47*b* protrude downward below the bottom end of the transverse wall 23*a*. The second mount portions 47*b* protrude downward through the bottom plate 21 and are exposed therefrom. The second mount portions 47*b* are positioned respectively at both sides of the second base portion 43*a* of the first metal fitting 40*a* in the transverse direction of the connector 10. A pair of the second mount portions 47*b* are positioned so as to straddle the second base portion 43*a* of the first metal fitting 40*a* in the front-rear direction. For example, the second mount portions 47*b* are disposed respectively at symmetrical positions in the front-rear direction with respect to the second base portion 43*a* of the first metal fitting 40*a*. In the front-rear direction, the distance between the second mount portions 47*b* is smaller than the distance between the first mount portions 44*b*. The second mount portions 47*b* are disposed so as to adjoin the second base portion 43*a* of the first metal fitting 40*a* in the front-rear direction.

The third mount portions 49*b* of the second metal fitting 40*b* are disposed along the outside surfaces of respective longitudinal walls 23*b*, the outside surfaces facing outward in the front-rear direction. The third mount portions 49*b* protrude downward below the longitudinal walls 23*b*. The third mount portions 49*b* are positioned respectively at both sides of the first metal fitting 40*a* in the transverse direction of the connector 10. A pair of the third mount portions 49*b* are positioned so as to straddle the second base portion 43*a* of the first metal fitting 40*a* in the front-rear direction. For example, the third mount portions 49*b* are disposed at symmetrical positions in the front-rear direction with respect to the mount portion 45*a* of the second base portion 43*a*. In the right-left direction, the third mount portions 49*b* are disposed substantially at the same positions as the mount portion 45*a* and the narrow portion 44*a* of the first metal fitting 40*a*.

In the connector 10 with the above-described structure, the mount portions 31 of respective first contacts 30 are soldered to patterned traces formed on the mount surface of the circuit substrate CB1. The mount portions 45*a* of respective first metal fittings 40*a*, and the first mount portions 44*b*, the second mount portions 47*b*, and the third mount portions 49*b* of respective second metal fittings 40*b* are soldered to corresponding patterned traces formed on the mount surface. Thus, the mount portions are fixed to the circuit substrate CB1, and the connector 10 is thereby mounted onto the circuit substrate CB1. For example, electronic components other than the connector 10, such as a central processing unit (CPU), a controller, and a memory, are also mounted on the mount surface of the circuit substrate CB1.

Figure 7:
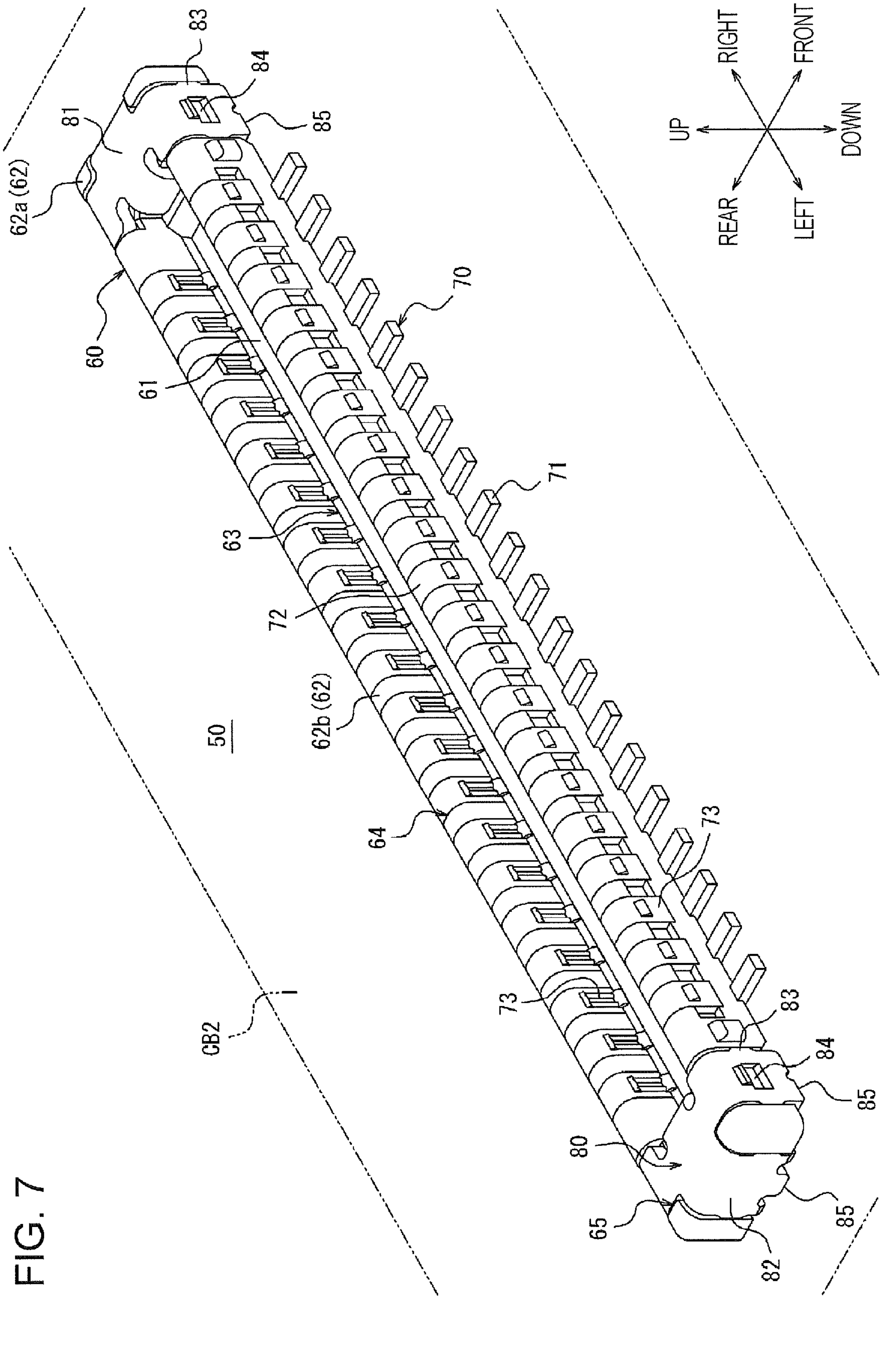
FIG. 7 is a perspective view, as viewed from above, illustrating the exterior of the connection object of FIG. 1.

The following describes the structure of the connection object 50 with reference mainly to FIG. 7.

FIG. 7 is a perspective view, as viewed from above, illustrating the exterior of the connection object 50 of FIG. 1. The connection object 50 can be obtained, for example, by forming the second insulator 60 integrally with the second contacts 70 and the metal fittings 80 using insert molding.

The second insulator 60 is a plate-like member elongated in the right-left direction. The second insulator 60 is made of a synthetic resin having insulating and heat-resisting properties using injection molding. The second insulator 60 includes a bottom plate 61 that constitutes the bottom part of the second insulator 60. The second insulator 60 includes annularly formed peripheral walls 62 that protrude upward from peripheral portions of the bottom plate 61, the peripheral portions extending in the front-rear and right-left directions. The peripheral walls 62 include transverse walls 62*a* and longitudinal walls 62*b*. The transverse walls 62*a* extend in the front-rear direction. The longitudinal walls 62*b* extend in the right-left direction. The second insulator 60 includes an engagement recess 63 surrounded by the peripheral walls 62 in the front-rear direction and in the right-left direction.

The second insulator 60 includes second-contact holding portions 64 each of which is fainted continuously in each longitudinal wall 62*b* and in the bottom plate 61. The second contacts 70 are mounted in respective second-contact holding portions 64. The second insulator 60 includes metal-fitting holding portions 65 formed in respective transverse walls 62*a*. The metal fittings 80 are attached to respective metal-fitting holding portions 65.

Each second contact 70 having a shape as illustrated is formed, for example, of a thin plate made of a copper alloy, such as phosphor bronze, beryllium copper, or copper-titanium alloy, or of a Corson system copper alloy, using progressive metal forming (stamping). The surface of the second contact 70 is plated with nickel to form a foundation layer and further plated with gold or tin thereover.

The second contact 70 includes a mount portion 71 that is an L-shaped protrusion protruding outward in the front-rear direction. The second contact 70 includes a curved portion 72 that is shaped like the letter U. The curved portion 72 protrudes upward from the mount portion 71. The second contact 70 includes a pair of contact points 73 that are formed on respective outside surfaces of the second contact 70, the outside surfaces facing outward in the front-rear direction and being positioned at the front side and at the rear side of the curved portion 72, respectively.

Each second contact 70 is formed integrally in a corresponding second-contact holding portion 64 of the second insulator 60 using insert molding. The contact points 73 are disposed respectively at the front surface and at the rear surface of each longitudinal wall 62*b*. The mount portion 71 protrude outward through the bottom plate 61 and further extend outward in the front-rear direction. The tip end of the mount portion 71 is positioned outside the longitudinal wall 62*b* in the front-rear direction.

Each metal fitting 80 is formed of a thin plate of an arbitrary metal so as to have a shape as illustrated using progressive metal forming (stamping). The method of manufacturing the metal fitting 80 includes a step of punching out a piece and a step of bending the punched piece in the thickness direction.

The metal fitting 80 includes a base portion 81 shaped tabularly. The metal fitting 80 includes first extension portions 82 that are shaped like the letter L. In the right-left direction, one of the first extension portions 82 extends outward from the outside edge of the base portion 81, and the other one extends inward from the inside edge of the base portion 81. The metal fitting 80 includes second extension portions 83 that extend outward respectively from both ends of the base portion 81 in the front-rear direction. Each second extension portion 83 is shaped like the letter L. The metal fitting 80 includes contact points 84 that are formed at respective outside surfaces of the second extension portions

83 in the front-rear direction. The metal fitting 80 includes mount portions 85 positioned at respective bottom ends of the second extension portions 83 and the first extension portion 82 facing outward. The metal fitting 80 is formed integrally in each metal-fitting holding portion 65 of the second insulator 60 using insert molding.

In the connection object 50 with the above-described structure, the mount portions 71 of respective second contacts 70 are soldered to patterned traces formed on the mount surface of the circuit substrate CB2. The mount portions 85 of respective metal fittings 80 are soldered to patterned traces formed on the mount surface. Thus, the connection object 50 is mounted on the circuit substrate CB2. For example, electronic components other than the connection object 50, such as a communication module, are also mounted on the mount surface of the circuit substrate CB2.

Figure 8:
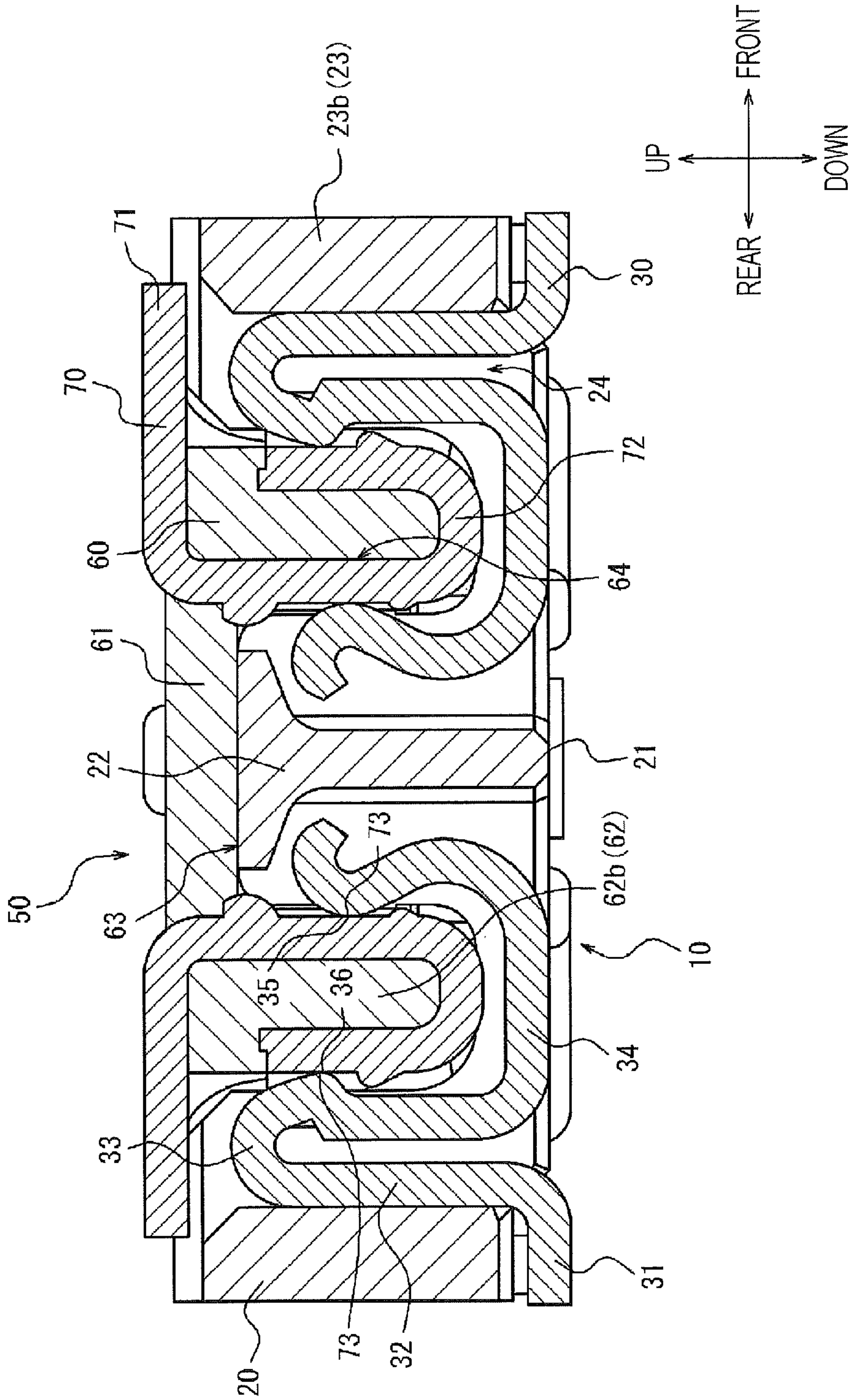
FIG. 8 is a cross-sectional view of the connector module taken along line VIII-VIII in FIG. 1.
Figure 9:
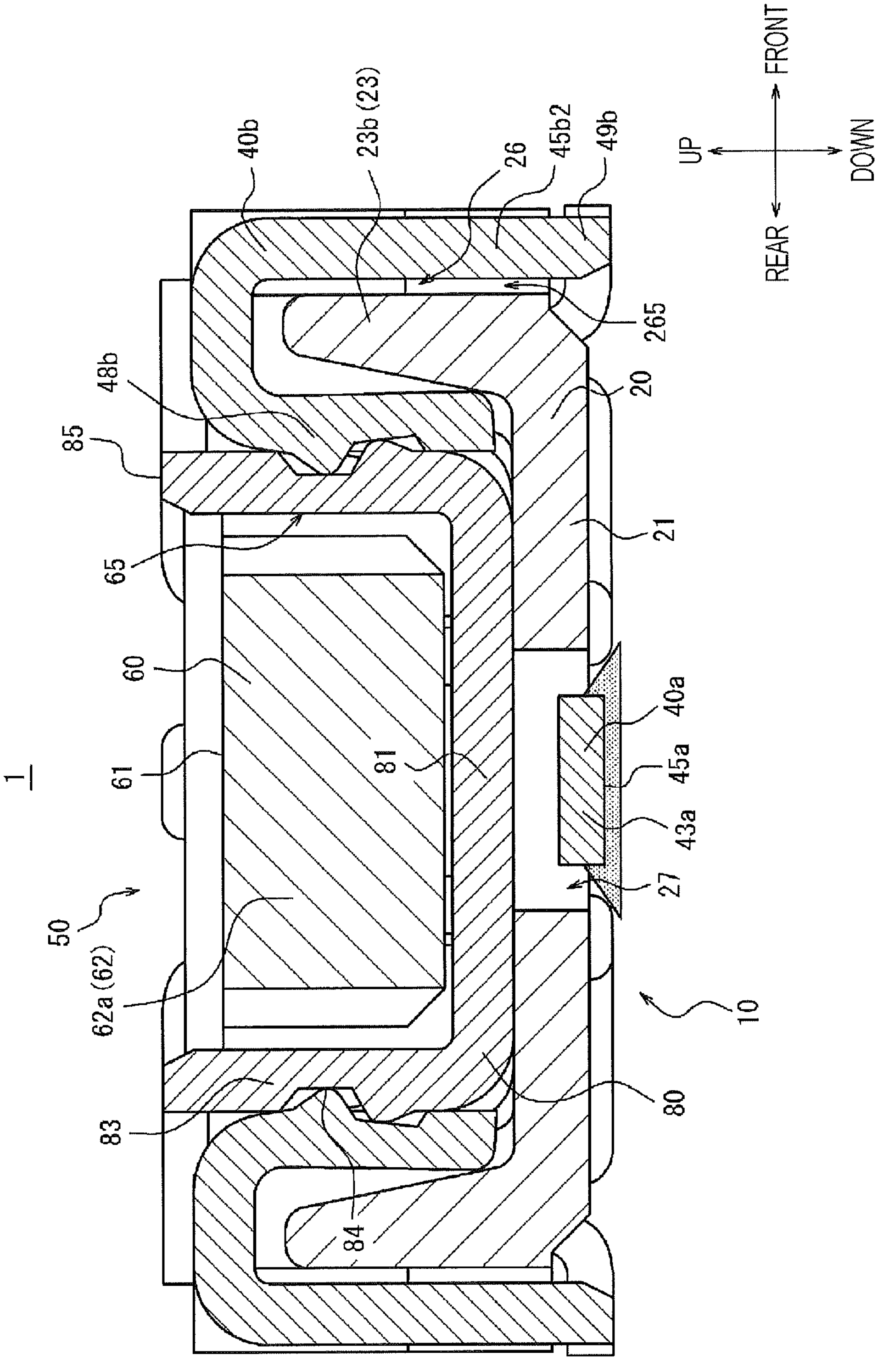
FIG. 9 is a cross-sectional view of the connector module taken along line IX-IX in FIG. 1.
Figure 10:
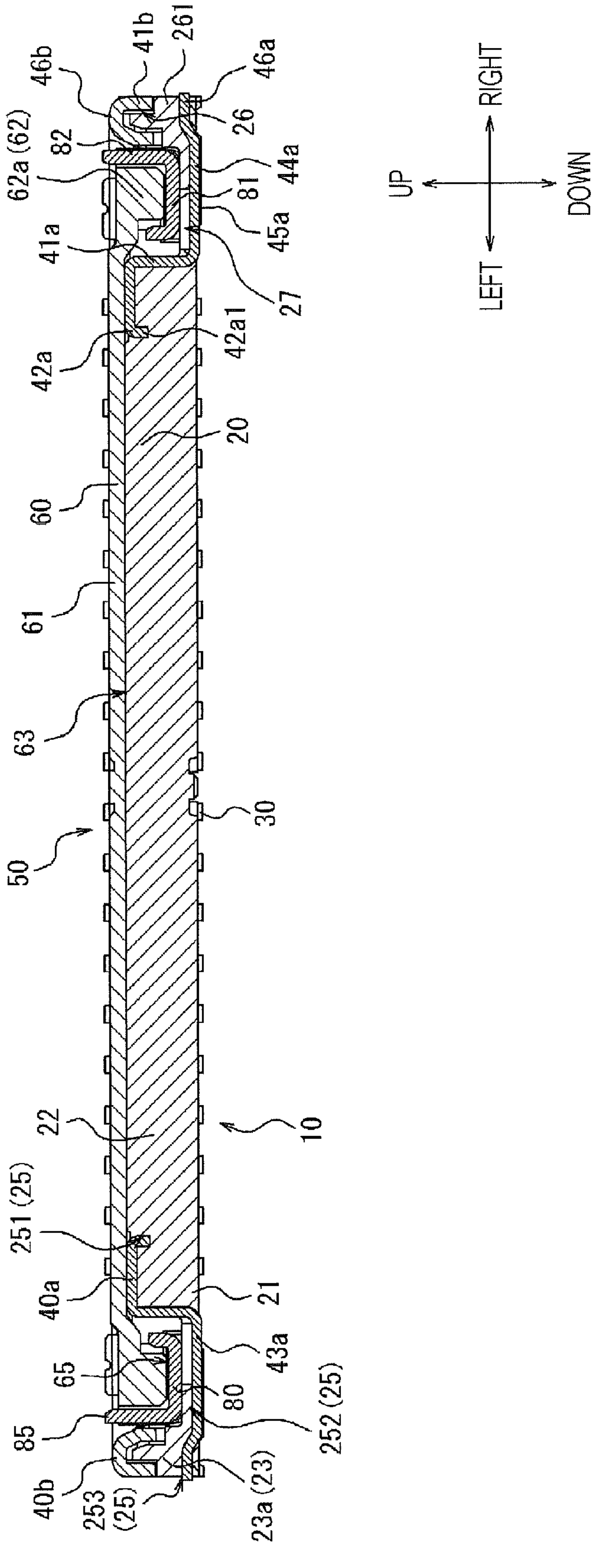
FIG. 10 is a cross-sectional view of the connector module taken along line X-X in FIG. 1.

The following description focuses on the structure of the connector module 1 in the engagement state in which the connector 10 and the connection object 50 are connected together and the first insulator 20 and the second insulator 60 engage each other with reference to FIGS. 8 to 10. FIG. 8 is a cross-sectional view of the connector module 1 taken along line VIII-VIII in FIG. 1.

For example, the orientation of the connection object 50 illustrated in FIG. 7 is first reversed upside down. In this state, the connection object 50 is positioned so as to oppose the connector 10 while the connector 10 and the connection object 50 are substantially aligned with each other in the front-rear direction and in the right-left direction. The connection object 50 is subsequently moved downward. The connection object 50 and the connector 10 are thereby connected to each other, in other words, the connector module 1 is in the connection state. Here, the engagement projection 22 of the first insulator 20 engages the engagement recess 63 of the second insulator 60.

In the engagement state, the elastic contact point 35 of each first contact 30 comes into contact with a corresponding contact point 73 of each second contact 70, and the elastic contact arm 34 having spring-like elasticity is elastically deformed inward in the front-rear direction. In the engagement state, the contact point 36 of the first contact 30 comes into contact with the other contact point 73 of the second contact 70. The first contact 30 comes into contact with the second contact 70 at two points in the front-rear direction, in other words, between the elastic contact point 35 and one of the contact points 73 and between the contact point 36 and the other contact point 73.

FIG. 9 is a cross-sectional view of the connector module 1 taken along line IX-IX in FIG. 1.

In the engagement state, the contact arms 48*b* of each second metal fitting 40*b* come into contact with the corresponding contact points 84 of each metal fitting 80. Here, the contact arms 48*b* having spring-like elasticity are deformed elastically outward in the front-rear direction. The second metal fitting 40*b* and the metal fitting 80 come into contact with each other at two points in the front-rear direction using the contact arms 48*b* and the contact points 84.

The top surface of the second base portion 43*a* is positioned below the top surface of the bottom plate 21. Accordingly, even if solder may reach the top surface of the second base portion 43*a*, the solder can be accommodated in the space formed between the top surface of the second base portion 43*a* and the base portion 81 of the metal fitting 80. This reduces the occurrence of engagement failure between the connector 10 and the connection object 50. In other words, this reduces the likelihood of an excessive amount of solder interfering the engagement between the connector 10 and the connection object 50.

The mount portion 45*a* that is formed widely increases the mounting strength of the connector 10 mounted on the circuit substrate CB1. In addition, the first insulator 20 includes the hole 27, which enables side fillets of solder to be formed, for example, as illustrated in FIG. 9. This increases the mounting strength of the connector 10 mounted on the circuit substrate CB1. This improves the robustness of the connector 10.

FIG. 10 is a cross-sectional view of the connector module taken along line X-X in FIG. 1.

Each metal fitting 80 of the connection object 50 is positioned between the corresponding first metal fitting 40*a* and the corresponding second metal fitting 40*b* in the engagement state in which the connector 10 and the connection object 50 engage each other. The metal fitting 80 is positioned between the first metal fitting 40*a* and the second metal fitting 40*b* in the longitudinal direction of the connector 10. In the engagement state, the second base portion 43*a* of the first metal fitting 40*a* is disposed so as to oppose the base portion 81 of the metal fitting 80 in the up-down direction. In the engagement state, the curved portion 46*b* of the second metal fitting 40*b* is disposed so as to oppose the outward-facing first extension portion 82 of the metal fitting 80 in the right-left direction.

Multiple first contacts 30 are arranged in a row in the arrangement direction, which is parallel to the longitudinal direction of the connector 10. Each first metal fitting 40*a* superposes a one first contact 30 positioned at each end of the row in the arrangement direction. For example, as illustrated in FIG. 5, the hook portion 42*a* of the first metal fitting 40*a* superposes the one first contact 30 positioned at the end in the arrangement direction. For example, a part of the hook portion 42*a* that extends in the right-left direction comes to the same position as that of the one first contact 30 in the right-left direction.

As illustrated in FIG. 10, the tip end 42*a*1 of the hook portion 42*a* of the first metal fitting 40*a* is positioned, in the arrangement direction, between the one first contact 30 and another first contact 30 disposed next to the one first contact 30. For example, another part of the hook portion 42*a* extending in the right-left direction is also positioned, together with the tip end 42*a*1 that extends in the up-down direction, between the one first contact 30 and another first contact 30 positioned next to the one first contact 30 in the arrangement direction.

In FIG. 10, the thickness of each first metal fitting 40*a* is substantially equal to or smaller than the thickness of each second metal fitting 40*b*. The thickness of the first metal fitting 40*a*, however, can be greater than the thickness of the second metal fitting 40*b* in order to increase the strength of the first metal fitting 40*a* relative to the second metal fitting 40*b*, for example, in a case where the first metal fitting 40*a* and the second metal fitting 40*b* are made of the same material.

The connector 10 according to the embodiment as described above improves the robustness during and after the engagement between the connector 10 and the connection object 50 even in the case of the connector 10 being reduced in size and height. In the connector 10, each first metal fitting 40*a* attached to the engagement projection 22 and the corresponding second metal fitting 40*b* attached to a peripheral wall 23 are separate members. This reduces a negative impact caused due to the connection object 50 hitting a metal fitting during engagement compared with a known art in which the metal fitting is formed integrally as one piece. For example, in the case of the connection object 50 hitting part of the metal fitting at the engagement projection 22 or at the peripheral wall 23, the likelihood of the impact extending to the other part of the metal fitting is reduced. This reduces the occurrence of breakage of the metal fitting that includes the first metal fitting 40*a* and the second metal fitting 40*b*. The reduction of the occurrence of breakage of the metal fitting leads to a reduction in the occurrence of breakage of the first insulator 20 to which the metal fitting is attached. This improves the product reliability of the connector 10.

Assume that the connector 10 and the connection object 50 engage each other in a misaligned state and that during the engagement, the connection object 50 comes into contact with a second metal fitting 40*b* on the peripheral wall 23 and causes the second metal fitting 40*b* and the peripheral wall 23 to deform and incline outward in the right-left direction. Even in this case, the likelihood of the impact extending to the engagement projection 22 is reduced. The deformation of the first metal fitting 40*a* can be reduced since the first metal fitting 40*a* and the second metal fitting 40*b* are separate members. Assume that the connection object 50 comes into contact with a first metal fitting 40*a* at the engagement projection 22 during engagement and causes the first metal fitting 40*a* and the engagement projection 22 to deform inward into the engagement projection 22 in the right-left direction. Even in this case, the likelihood of the impact extending to the peripheral wall 23 is reduced. The likelihood of deformation of the second metal fitting 40*b* can be reduced since the first metal fitting 40*a* and the second metal fitting 40*b* are separate members. Accordingly, each metal fitting behaves differently and independently at the engagement projection 22 and at the peripheral wall 23. The behavior of the metal fitting at the engagement projection 22 does not readily propagate to the metal fitting at the peripheral wall 23, and vice versa. This reduces the occurrence of the breakage, and the metal fittings together can perform an expected function reliably.

The reduction of the occurrence of breakage of the metal fittings and the first insulator 20 reduces the likelihood of displacement of the connector 10 and the connection object 50 relative to each other in the contact arrangement direction, in other words, in the longitudinal direction of the connector 10, during and after the engagement. As a result, electrical continuity between the first contacts 30 and the corresponding second contacts 70 can be achieved exactly as specified in design. The likelihood of the connector module 1 loosening can also be reduced after the engagement. Positioning function of the connector 10 and the connection object 50 relative to each other can be maintained. As a result, the connector 10 and the connection object 50 do not come off easily from each other, which improves the product reliability of the connector module 1.

In the connector 10, the first metal fitting 40*a* and the second metal fitting 40*b* are different members, which enables the strength of one of the first metal fitting 40*a* and the second metal fitting 40*b* to increase relative to the other. In the connector 10, the first metal fitting 40*a* and the second metal fitting 40*b* are attached to different members, such as the engagement projection 22 and the peripheral wall 23, for the different purposes. The first metal fitting 40*a* and the second metal fitting 40*b* can be formed so as to have appropriate strengths suitable for the different positions and purposes. Assume that these metal fittings are formed integrally into one piece as is the case for the known art. When it is necessary to reduce the strength of a portion of the metal fitting at the engagement projection 22 or at the peripheral wall 23, the strength of the other portion of the metal fitting inevitably decreases.

For example, the first metal fitting 40*a* attached to the engagement projection 22 is disposed for the purpose of improving the robustness of the engagement projection 22. The first metal fitting 40*a* is not intended for electrical connection with the metal fitting 80 of the connection object 50 in the engagement state. On the other hand, the second metal fitting 40*b* attached to the peripheral wall 23 is disposed for the purpose of electrical connection with the metal fitting 80 in the engagement state. For this purpose, the second metal fitting 40*b* includes the elastically deformable contact arms 48*b*.

Accordingly, the second metal fitting 40*b* is preferably made of a material having a suitable strength to serve as a spring, while the first metal fitting 40*a* is preferably made of a material that is greater in strength. In the connector 10, the first metal fitting 40*a* and the second metal fitting 40*b* can be formed so as to have appropriate strengths suitable for respective purposes. If, for example, the metal fittings are formed integrally into one piece as is the case for the known art, the necessity to form elastically deformable contact arms at the peripheral wall leads to a decrease in the overall strength of the metal fitting, which results in a decrease in the robustness of the engagement projection.

In the connector 10, however, the material of the first metal fitting 40*a* is different from that of the second metal fitting 40*b*. The metal fittings can be formed easily so as to increase the strength of one of the first metal fitting 40*a* and the second metal fitting 40*b* relative to the strength of the other. For example, the materials of the first metal fitting 40*a* and the second metal fitting 40*b* can be selected appropriately to meet the objectives of these metal fittings.

The first metal fitting 40*a*, which is made of a material stronger than that of the second metal fitting 40*b*, improves the robustness of the engagement projection 22 to which the first metal fitting 40*a* is attached. This reduces the occurrence of breakage of the engagement projection 22 of the first insulator 20 to which the first metal fitting 40*a* is attached. As a result, the product reliability of the connector 10 is improved.

In the case of the first metal fitting 40*a* having a thickness greater than that of the second metal fitting 40*b*, the strength of the first metal fitting 40*a* becomes greater than that of the second metal fitting 40*b* even if, for example, the first metal fitting 40*a* and the second metal fitting 40*b* are made of the same material. As a result, the robustness of the engagement projection 22 to which the first metal fitting 40*a* is attached also increases.

A pair of the first metal fittings 40*a* are attached to respective opposite ends of the engagement projection 22 in the longitudinal direction of the connector 10, which improves the robustness of the engagement projection 22 at both ends. This further reduces the occurrence of breakage of the engagement projection 22 of the first insulator 20 to which the first metal fittings 40*a* are attached. As a result, the product reliability of the connector 10 is further improved.

In the connector 10, each first metal fitting 40*a* includes the mount portion 45*a* to be mounted on the circuit substrate CB1, which improves the robustness of the first metal fitting 40*a*, This reduces the deformation of the first metal fitting 40*a* even when a load is applied thereto. As a result, dimensional accuracy and shape integrity of the connector 10 can be maintained during the engagement. This improves, for example, the robustness of the engagement projection 22 to which the first metal fitting 40*a* is attached.

This can reduce the occurrence of breakage or deformation of the engagement projection 22 and can reduce the likelihood of the connector 10 loosening or being displaced in the longitudinal direction.

The mount portion 45*a* of the first metal fitting 40*a* is disposed at a position outside of, and adjacent to, the engagement projection 22. In other words, the mount portion 45*a* is present at a position obliquely below a portion to which an external force tends to act, such as the curved portion of the first base portion 41*a* that is integrally joined to the end portion of the engagement projection 22. Accordingly, the mount portion 45*a* can effectively receive the external force acting on the first metal fitting 40*a*. This further improves the robustness of the first metal fitting 40*a* and the engagement projection 22.

The mount portion 45*a* includes the bottom surface of the second base portion 43*a*. The second base portion 43*a* extends in the longitudinal direction of the connector 10, and the bottom surface faces the circuit substrate CB1. Accordingly, the mount portion 45*a* can receive the external force acting on the first metal fitting 40*a*. The mount portion 45*a* is fixed to the circuit substrate CB1, and the first metal fitting 40*a* is thereby fixed to the circuit substrate CB1. As a result, even if an external force acts on the first metal fitting 40*a*, the mount portion 45*a* can absorb the resulted impact. This improves the robustness of the first metal fitting 40*a* extending in the longitudinal direction of the connector 10. This further improves the robustness of the engagement projection 22 extending also in the longitudinal direction of the connector 10.

The first metal fitting 40*a* superposes the one first contact 30 positioned at each end of the row of the first contacts 30 in the arrangement direction, which can reduce the length of the connector 10 in the longitudinal direction. This can reduce the longitudinal length of the connector module 1 and contributes to the overall size reduction of the connector module 1. Moreover, this improves the strength of the connector module 1 against external force.

The tip end 42*a*1 of the hook portion 42*a* of the first metal fitting 40*a* is positioned between the one first contact 30 and another first contact 30 in the arrangement direction. As a result, an arbitrarily shaped tip end structure of the hook portion 42*a* is positioned where a first-contact mounting groove 24 is not formed and the first insulator 20 has a larger thickness. This increases the holding strength of the first insulator 20 holding the tip end 42*a*1 of the hook portion 42*a*. This increases the holding strength of the first insulator 20 holding the first metal fitting 40*a*. In addition, the arbitrarily shaped tip end structure of the hook portion 42*a* is positioned where the first insulator 20 has a larger thickness. This suppresses the stiffness reduction of the engagement projection 22 of the first insulator 20 compared with the case in which the tip end structure of the hook portion 42*a* is positioned where the first-contact mounting groove 24 is formed.

The hook portion 42*a* is shaped like the letter L, and the tip end 42*a*1 of the hook portion 42*a* is embedded in the engagement projection 22, which reduces the likelihood of the hook portion 42*a* being turned up. This increases the holding strength of the first insulator 20 holding the hook portion 42*a*. Consequently, this increases the holding strength of the first insulator 20 holding the first metal fitting 40*a*.

The first base portion 41*a* and the second base portion 43*a* are formed integrally so as to have the crank-like shape as a whole. Accordingly, the entire first metal fitting 40*a* integrally fits the first insulator 20 so as to follow the shape of the end portion of the engagement projection 22 and the shape of the bottom plate 21. This increases the holding strength of the first insulator 20 holding the first metal fitting 40*a*.

The second base portion 43*a* continues to the first base portion 41*a* so as to maintain the same width in the transverse direction of the connector 10. This improves the strength of the connection portion between the first base portion 41*a* and the second base portion 43*a*, which leads to an increase in the strength of the first metal fitting 40*a*. Consequently, this improves the robustness of the engagement projection 22 to which the first metal fitting 40*a* is attached.

The width of the hook portion 42*a* is smaller than the width of any other portion of the first metal fitting 40*a* in the transverse direction of the connector 10. This increases the thickness of the first insulator 20 where the hook portion 42*a* is integrated. For example, even if the hook portion 42*a* superposes the one first contact 30 positioned at the end in the arrangement direction, in other words, the hook portion 42*a* superposes the first-contact mounting groove 24, the strength of the first insulator 20 can be maintained because the width of the hook portion 42*a* is small. As a result, the robustness of the connector 10 improves.

The second base portion 43*a* of each first metal fitting 40*a* extends in the longitudinal direction of the connector 10 from the engagement projection 22 to the corresponding transverse wall 23*a* to which a second metal fitting 40*b* is attached. This improves the robustness of the first metal fitting 40*a* extending in the longitudinal direction of the connector 10. Consequently, this improves the robustness of the engagement projection 22 extending in the longitudinal direction of the connector 10. The same effect can be obtained between the engagement projection 22 and the corresponding transverse wall 23*a* that are spaced from each other in the longitudinal direction of the connector 10. Even if the connection object 50 hits part of the metal fitting at the engagement projection 22 or at the transverse wall 23*a*, the likelihood of the impact extending to the other part of the metal fitting is reduced.

The mount portion 45*a* is positioned between the engagement projection 22 and the transverse wall 23*a*. In other words, the mount portion 45*a* is positioned adjacent to a portion of the first metal fitting 40*a* on which an external force is likely to act. For example, the mount portion 45*a* is positioned obliquely below the curved portion of the first base portion 41*a*, and the curved portion is a portion that is integrally joined to the end portion of the engagement projection 22 and on which an external force tends to act. The mount portion 45*a* is positioned in the first base portion 41*a* near or on an imaginary extension line drawn in a direction of an external force from the point on which the external force acts. Accordingly, the mount portion 45*a* effectively receives the external force acting on the first metal fitting 40*a*. This further improves the robustness of the first metal fitting 40*a* and the engagement projection 22.

Each second metal fitting 40*b* has the second mount portions 47*b* that are disposed in the right-left direction along the inside surface of the corresponding transverse wall 23*a*. The second mount portions 47*b* are disposed such that the transverse wall 23*a* is interposed between the second mount portions 47*b* and the first mount portions 44*b*. This improves the robustness of the second metal fitting 40*b* and the transverse wall 23*a* in the right-left direction. For example, this reduces the likelihood of the second metal fitting 40*b* and the transverse wall 23*a* being deformed in the right-left direction. For example, the second metal fitting 40*b* and the transverse wall 23*a* do not incline outward easily in the right-left direction during the engagement. The connector 10 and the connection object 50 may engage each other in a misaligned state, and the connection object 50 may hit the second metal fitting 40*b* on the transverse wall 23*a* during the engagement. Even in this case, the likelihood of deformation of the second metal fitting 40*b* and the transverse wall 23*a* is reduced.

The reduction of the likelihood of deformation of the second metal fitting 40*b* and the transverse wall 23*a* further reduces the likelihood of displacement of the connector 10 in the longitudinal direction during and after the engagement between the connector 10 and the connection object 50. As a result, electrical continuity between the first contacts 30 and the corresponding second contacts 70 can be achieved exactly as specified in design. The likelihood of the connector module 1 loosening can also be reduced after the engagement. As a result, the dimensional accuracy and the shape integrity of the connector 10 can be maintained during the engagement. Positioning function of the connector 10 and the connection object 50 relative to each other can be maintained even after the engagement. As a result, the connector 10 and the connection object 50 do not come off easily from each other, which improves the product reliability of the connector module 1.

The first mount portions 44*b* of the second metal fitting 40*b* are disposed respectively at both sides of the first metal fitting 40*a* in the transverse direction of the connector 10. The second mount portions 47*b* of the second metal fitting 40*b* are disposed respectively at both sides of the first metal fitting 40*a* in the transverse direction of the connector 10. This increases the mounting strength of the second metal fitting 40*b* mounted on the circuit substrate CB1. This improves the robustness of the second metal fitting 40*b* and the transverse wall 23*a* in the right-left direction.

In the front-rear direction, the distance between the first mount portions 44*b* is larger than the distance between the second mount portions 47*b*, which increases the mounting strength of the second metal fitting 40*b* mounted on the circuit substrate CB1. For example, even if the distance between the second mount portions 47*b* inevitably decreases in the front-rear direction at the inner side of the transverse wall 23*a*, the distance between the first mount portions 44*b* in the front-rear direction remains to be large. As a result, the mounting strength of the second metal fitting 40*b* mounted on the circuit substrate CB1 increases. This improves the robustness of the second metal fitting 40*b* and the transverse wall 23*a* in the right-left direction.

The first wall portion 261 of which the width is large in the front-rear direction is nipped in the recess of the second metal fitting 40*b* of which the size is large in the front-rear direction. This increases the holding power of the second-metal-fitting mounting portion 26 in holding the second metal fitting 40*b*.

A pair of the third mount portions 49*b* are disposed substantially at the same position as the mount portion 45*a* in the right-left direction. Accordingly, three mount portions are aligned along an imaginary line extending in the front-rear direction. This increases the mounting strength of the connector 10 mounted on the circuit substrate CB1. Even if the connection object 50 and the connector 10 engage each other in a misaligned state in which the connection object 50 is, for example, rotated relative to the connector 10 by a certain degree about an axis extending in the up-down direction, the connector 10 remains to be mounted on the circuit substrate CB1. Similarly, even if the circuit substrate CB1 having the connector 10 mounted thereon is rotated after the engagement, the connector 10 remains to be mounted on the circuit substrate CB1. Accordingly, the robustness of the connector 10 mounted on the circuit substrate CB1 improves.

Portions of the second metal fitting 40*b* are present at both sides of the second base portion 43*a* of the first metal fitting 40*a* in the transverse direction of the connector 10. Accordingly, the attaching area of the second metal fitting 40*b* to be attached to the first insulator 20 increases. Consequently, this increases the holding strength of the first insulator 20 holding the second metal fitting 40*b*.

The second metal fittings 40*b* are attached to respective transverse walls 23*a*, which improves the robustness of the transverse walls 23*a* at both ends of each peripheral wall 23 extending in the right-left direction. This further reduces the occurrence of breakage of the transverse walls 23*a* of the first insulator 20 to which respective second metal fittings 40*b* are attached. As a result, the product reliability of the connector 10 is further improved.

Each second metal fitting 40*b* includes the elastically deformable contact arms 48*b* that come into contact with the metal fitting 80 in the engagement state. The contact arms 48*b*, which exert elastic forces to the metal fitting 80, can maintain the state of connection with the metal fitting 80 reliably. Accordingly, the electrical continuity can be maintained between the second metal fitting 40*b* and the metal fitting 80 in the engagement state.

The first metal fitting 40*a* and the second metal fitting 40*b*, which are spaced away from each other, oppose each other in the right-left direction, and the metal fitting 80 of the connection object 50 is positioned between the first metal fitting 40*a* and the second metal fitting 40*b* in the engagement state in which the connector 10 and the connection object 50 engage each other. The structure in which the metal fitting 80 is interposed between the first metal fitting 40*a* and the second metal fitting 40*b* in the engagement state reduces the likelihood of the connector module 1 loosening after the engagement. As a result, the dimensional accuracy and the shape integrity of the connector 10 can be maintained during the engagement. Positioning function of the connector 10 and the connection object 50 relative to each other can be maintained even after the engagement. As a result, the connector 10 and the connection object 50 do not come off easily from each other, which improves the product reliability of the connector module 1.

The first metal fitting 40*a* and the first insulator 20 are formed integrally using insert molding, which further improves the robustness of the first metal fitting 40*a* and the engagement projection 22. The end portion 46*a* of each first metal fitting 40*a* is formed integrally in the third cavity 253 of the first-metal-fitting holding portion 25 of each transverse wall 23*a*, in other words, formed integrally with the first insulator 20. This increases the contact area between the first metal fitting 40*a* and the first insulator 20. Consequently, this increases the holding strength of the first insulator 20 holding the first metal fitting 40*a*, which are formed by insert molding. This further improves the robustness of the first metal fitting 40*a* and the engagement projection 22.

The second base portion 43*a* is formed widely at the position of the hole 27 in the right-left direction. The second base portion 43*a* also includes the narrow portion 44*a* that extends from the wide portion toward the transverse wall 23*a*. The narrow portion 44*a* is formed narrowly and is in close contact with the bottom plate 21. Accordingly, the thickness of the bottom plate 21 increases where the second base portion 43*a* is integrated with the bottom plate 21.

Consequently, this increases the strength of the first insulator 20. As a result, the robustness of the connector 10 improves.

Those skilled in the art can obviously implement the present disclosure in a form other than the above-described embodiment without departing from the spirit or the essential features of the present disclosure. As such, the above description is only illustrative and should not be construed as limiting. The scope of the disclosure is not limited by the above description but by the appended claims. Variations that fall within the scope of the claim or the equivalents thereof are to be included in the present disclosure.

For example, the shapes, arrangements, and orientations of elements as well as the number of elements are not limited to what is disclosed in the above description and in the drawings. The shapes, arrangements, and orientations of elements as well as the number of elements may be changed arbitrarily insofar as the specified functions can be implemented.

For example, in the connector 10, the second metal fittings 40*b* may be integrated into the first insulator 20 by insert molding rather than by press-fitting. For example, in the connector 10, the first metal fittings 40*a* may be attached to the first insulator 20 by press-fitting rather than by insert molding.

In the above description of the embodiment, the first metal fitting 40*a* and the second metal fitting 40*b* are separated from each other. However, the first metal fitting 40*a* and the second metal fitting 40*b* do not need to be separated but may be connected. In this case, the first metal fitting 40*a* and the second metal fitting 40*b* may be formed integrally but may have different strengths. For example, the metal fitting in which the first metal fitting 40*a* and the second metal fitting 40*b* are integrated may be made of a functionally graded material. More specifically, the material of the portion of the first metal fitting 40*a* may have a strength greater than that of the material of the portion of the second metal fitting 40*b*. For example, the metal fitting in which the first metal fitting 40*a* and the second metal fitting 40*b* are integrated may be formed so as to have different thicknesses. More specifically, the thickness of the portion of the first metal fitting 40*a* may be greater than that of the portion of the second metal fittings 40*b*.

In the above description of the embodiment, the strength of the first metal fitting 40*a* is greater than the strength of the second metal fitting 40*b*. However, the strength of the second metal fitting 40*b* may be greater than that of the first metal fitting 40*a*.

In the above description of the embodiment, the thickness of the first metal fitting 40*a* is greater than the thickness of the second metal fitting 40*b* in order to increase the strength of the first metal fitting 40*a* relative to the strength of the second metal fitting 40*b*. For example, the thickness of the first metal fitting 40*a* may be smaller than that of the second metal fitting 40*b*, while the strength of the first metal fitting 40*a* is greater than that of the second metal fitting 40*b*. On the contrary, the thickness of the first metal fitting 40*a* may be greater than that of the second metal fitting 40*b*, while the strength of the first metal fitting 40*a* is smaller than that of the second metal fitting 40*b*.

In the above description of the embodiment, each first metal fitting 40*a* superposes the one first contact 30 in the arrangement direction. The first metal fitting 40*a*, however, does not need to superpose the one first contact 30 in the arrangement direction if the size reduction of the connector 10 in the longitudinal direction can be achieved using a different method.

In the above description of the embodiment, the tip end 42*a*1 of the hook portion 42*a* of each first metal fitting 40*a* is positioned between the one first contact 30 and another first contact 30 in the arrangement direction. However, the tip end 42*a*1 of the hook portion 42*a* of the first metal fitting 40*a* may be disposed at the same right-left position at which, for example, a first contact 30 is attached, insofar as the holding strength of the first insulator 20 holding the tip end 42*a*1 of the hook portion 42*a* can be maintained.

In the above description of the embodiment, the hook portion 42*a* is shaped like the letter L, and the tip end 42*a*1 of the hook portion 42*a* is embedded inside the engagement projection 22. The hook portion 42*a*, however, may have any shape other than the shape like the letter L insofar as the holding strength of the first insulator 20 holding the hook portion 42*a* can be maintained. In addition, the tip end 42*a*1 of the hook portion 42*a* does not need to be embedded inside the engagement projection 22.

In the above description of the embodiment, the width of the hook portion 42*a* is smaller than the width of any other portion of the first metal fitting 40*a* in the transverse direction of the connector 10. The hook portion 42*a*, however, may have the same width as that of any other portion of the first metal fitting 40*a* insofar as the strength of the first insulator 20 can be maintained.

In the above description of the embodiment, the second base portion 43*a* extends from the engagement projection 22 to the corresponding transverse wall 23*a* to which the second metal fitting 40*b* is attached. The second base portion 43*a*, however, may extend by an arbitrary length from the engagement projection 22 toward the transverse wall 23*a* if the robustness of the first metal fitting 40*a* improves in the longitudinal direction of the connector 10.

In the above description of the embodiment, the mount portion 45*a* is positioned between the engagement projection 22 and the transverse wall 23*a*. The mount portion 45*a*, however, may be disposed at an arbitrary position in the first metal fitting 40*a* insofar as the mount portion 45*a* is positioned adjacent to a portion of the first metal fitting 40*a* on which an external force is likely to act. For example, the mount portion 45*a* may be formed at the same position as the position of the end of the engagement projection 22 in the right-left direction.

In the above description of the embodiment, each second metal fitting 40*b* is attached to the corresponding transverse wall 23*a*. The second metal fitting 40*b*, however, does not need to be attached to the transverse wall 23*a* and may be attached, for example, only to the longitudinal walls 23*b*.

In the above description of the embodiment, the second metal fitting 40*b* has the second mount portions 47*b* that are disposed along the inside surface of each transverse wall 23*a* facing inward in the right-left direction in such a manner that the transverse wall 23*a* is interposed between the second mount portions 47*b* and the first mount portions 44*b*. The second metal fitting 40*b*, however, does not need to include the second mount portions 47*b* insofar as the robustness of the second metal fitting 40*b* and the transverse wall 23*a* can be maintained.

In the above description of the embodiment, the first mount portions 44*b* of the second metal fitting 40*b* are disposed respectively at both sides of the first metal fitting 40*a* in the transverse direction of the connector 10, and the second mount portions 47*b* of the second metal fitting 40*b* are disposed respectively at both sides of the first metal fitting 40*a* in the transverse direction of the connector 10. However, one the first mount portions 44*b* or the second mount portions 47*b* may be disposed at both sides of the first metal fitting 40*a* in the transverse direction of the connector 10. Only one first mount portion 44*b* or three or more first mount portions 44*b* may be provided rather than the two first mount portions 44*b*. Similarly, only one second mount portion 47*b* or three or more second mount portions 47*b* may be provided rather than the two second mount portions 47*b*.

In the above description of the embodiment, each second metal fitting 40*b* includes the elastically deformable contact arms 48*b* that come into contact with each metal fitting 80 of the connection object 50 in the engagement state. The second metal fitting 40*b*, however, may come into contact with the metal fitting 80 without deforming elastically. Moreover, the second metal fitting 40*b* does not need to come into contact with the metal fitting 80.

Figure 11:
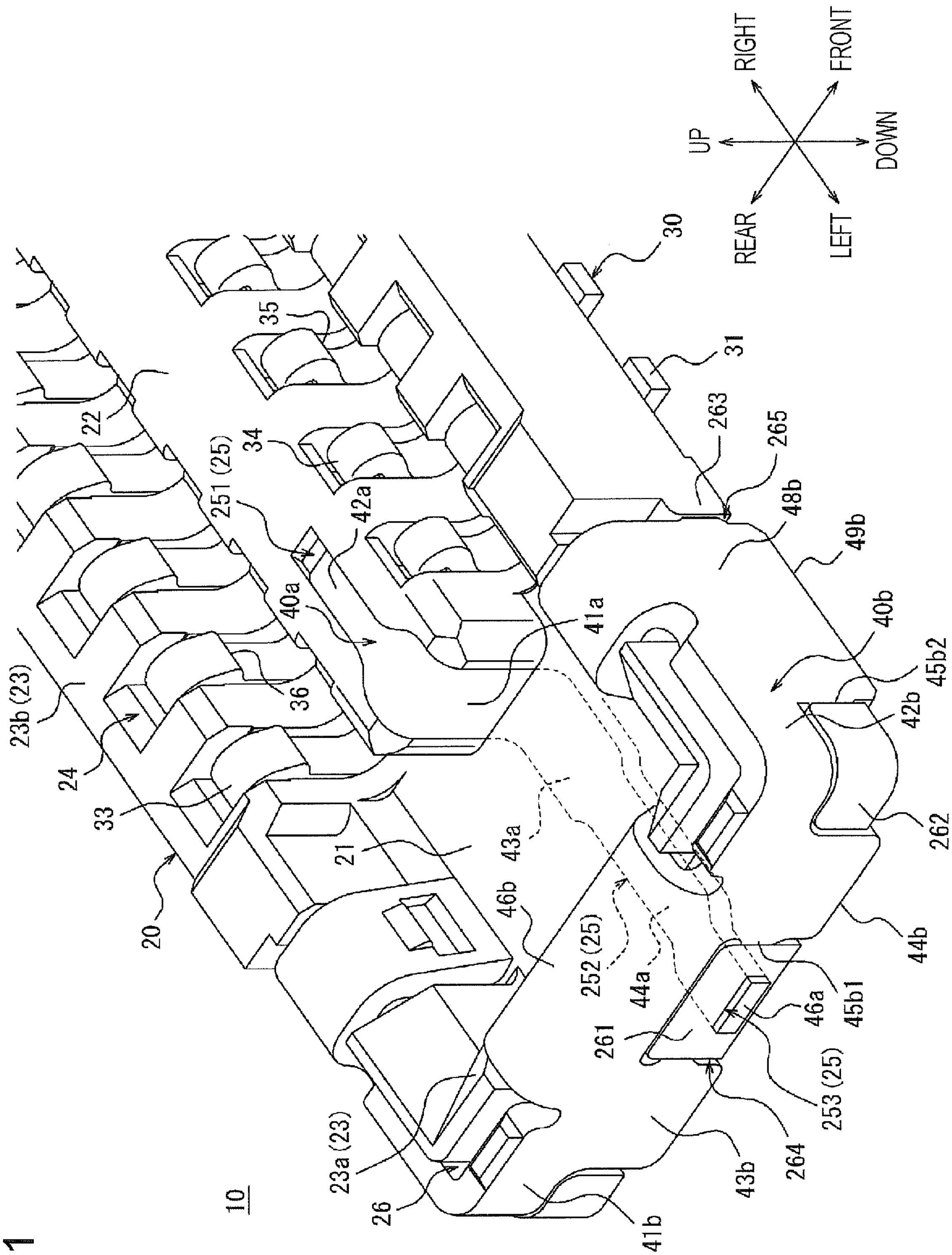
FIG. 11 is an enlarged view illustrating a variation of the connector of the embodiment, the view corresponding to FIG. 5.

FIG. 11 is an enlarged view illustrating a variation of the connector 10 of the embodiment, the view corresponding to FIG. 5. In the above description of the embodiment, part of the second base portion 43*a* is exposed in the hole 27 of the first insulator 20. However, as illustrated in FIG. 11, the top surface of the second base portion 43*a* may be entirely covered by the first insulator 20. The first insulator 20 does not need to have the hole 27. This increases the holding strength of the first insulator 20 holding the first metal fitting 40*a*, which are formed by insert molding. This further improves the robustness of the first metal fitting 40*a* and the engagement projection 22.

In the above description of the embodiment, the first insulator 20 includes the hole 27 that pierces through the bottom plate 21 in the up-down direction. The first insulator 20, however, may include a recess formed in the bottom plate 21 in place of the hole 27.

The connector module 1, the connector 10, and the connection object 50 described above are mounted in an electronic apparatus that includes the circuit substrate CB1 and the circuit substrate CB2. For example, the type of electronic apparatus may be any communication terminal equipment, such as a smartphone, and any information processing equipment, such as a personal computer, a copier, a printer, a facsimile, or a multifunction printer. For example, the type of electronic apparatus may be any onboard equipment, such as a camera, a radar, a car digital video recorder, or an engine control unit. For example, the type of electronic apparatus may be any other onboard equipment to be used in an onboard system, such as a car navigation system, an advanced driver-assistance system, or a security system. Moreover, the type of electronic apparatus may be any arbitrary industrial equipment.

In the above-described electronic apparatus, the robustness of the connector 10 is improved during the engagement between the connector 10 and the connection object 50 even in the case of the connector 10 being reduced in size and height. This improves the product reliability of the electronic apparatus.

REFERENCE SIGNS

1 connector module
10 connector
20 first insulator (insulator)
21 bottom plate
22 engagement projection
23 peripheral wall
23*a* transverse wall
23*b* longitudinal wall
24 first-contact mounting groove
25 first-metal-fitting holding portion
251 first cavity
252 second cavity
253 third cavity
26 second-metal-fitting mounting portion
261 first wall portion
262 second wall portion
263 third wall portion
264 first mounting groove
265 second mounting groove
27 hole
30 first contact
31 mount portion
32 locking portion
33 curved portion
34 elastic contact arm
35 elastic contact point
36 contact point
40*a* first metal fitting
41*a* first base portion
42*a* hook portion
42*a*1 tip end
43*a* second base portion
44*a* narrow portion
45*a* mount portion
46*a* end portion
40*b* second metal fitting
41*b* first base portion
42*b* second base portion
43*b* protruding portion
44*b* first mount portion
45*b*1 locking portion
45*b*2 locking portion
46*b* curved portion
47*b* second mount portion
48*b* contact arm
49*b* third mount portion
50 connection object
60 second insulator
61 bottom plate
62 peripheral wall
62*a* transverse wall
62*b* longitudinal wall
63 engagement recess
64 second-contact holding portion
65 metal-fitting holding portion
70 second contact
71 mount portion
72 curved portion
73 contact point
80 metal fitting
81 base portion
82 first extension portion
83 second extension portion
84 contact point
85 mount portion
CB1 circuit substrate (first circuit substrate)
CB2 circuit substrate (second circuit substrate)

The invention claimed is:

1. A connector configured to engage a connection object, the connector comprising:

an insulator comprising an engagement projection and a peripheral wall surrounding the engagement projection;

a first metal fitting attached to the engagement projection; and a second metal fitting attached to the peripheral wall, wherein the first metal fitting and the second metal fitting are separate members, and wherein a strength of the first metal fitting and a strength of the second metal fitting are different from each other, wherein the first metal fitting comprises a second base portion extending in the longitudinal direction of the connector and a mount portion to be mounted onto a circuit substrate, and further wherein the mount portion includes a bottom surface of the second base portion, the bottom surface facing the circuit substrate.

2. The connector according to claim 1, wherein the first metal fitting and the second metal fitting are spaced away from each other.

3. The connector according to claim 1, wherein a material of the first metal fitting is different from a material of the second metal fitting.

4. The connector according to claim 3, wherein a strength of the material of the first metal fitting is greater than a strength of the material of the second metal fitting.

5. The connector according to claim 1, wherein a thickness of the first metal fitting is greater than a thickness of the second metal fitting.

6. The connector according to claim 1, further comprising a pair of the first metal fittings, wherein the pair of first metal fittings are attached to respective ends of the engagement projection, the ends being positioned opposite to each other in a longitudinal direction of the connector.

7. The connector according to claim 1, wherein the first metal fitting comprises a first base portion shaped like a letter L, the first base portion extending from the second base portion, and the first base portion and the second base portion are formed integrally so as to have a crank-like shape.

8. The connector according to claim 1, wherein the peripheral wall comprises a longitudinal wall and a transverse wall, and the second base portion extends from the engagement projection to the transverse wall to which the second metal fitting is attached.

9. The connector according to claim 8, wherein the mount portion is positioned between the engagement projection and the transverse wall.

10. The connector according to claim 8, wherein the second metal fitting comprises a first mount portion disposed along an outside surface of the transverse wall, the outside surface facing outward in the longitudinal direction, and a second mount portion disposed along an inside surface of the transverse wall, the inside surface facing inward in the longitudinal direction in such a manner that the transverse wall is interposed between the first mount portion and the second mount portion.

11. The connector according to claim 10, wherein at least one of the first mount portion and the second mount portion of the second metal fitting is disposed at both sides of the first metal fitting in a transverse direction of the connector.

12. The connector according to claim 8, further comprising a pair of the second metal fittings, wherein the peripheral wall comprises a pair of the transverse walls, and the pair of second metal fittings are attached to respective ones of the pair of transverse walls.

13. The connector according to claim 1, wherein the second metal fitting comprises an elastically deformable contact arm configured to engage a metal fitting of the connection object in an engagement state in which the connector and the connection object engage each other.

14. The connector according to claim 1, wherein the second metal fitting is disposed at such a position that the metal fitting of the connection object is interposed between the second metal fitting and the first metal fitting in the engagement state in which the connector and the connection object engage each other.

15. The connector according to claim 1, wherein the first metal fitting and the insulator are integrally formed using insert molding.

16. The connector according to claim 1, wherein the connector is mounted on a first circuit substrate and is connected to the connection object mounted on a second circuit substrate.

17. An electronic apparatus comprising the connector according to claim 1.

* * * * *